United States Patent
Deng et al.

(10) Patent No.: US 10,290,219 B2
(45) Date of Patent: May 14, 2019

(54) MACHINE VISION-BASED METHOD AND SYSTEM FOR AIRCRAFT DOCKING GUIDANCE AND AIRCRAFT TYPE IDENTIFICATION

(71) Applicants: SHENZHEN CIMC-TIANDA AIRPORT SUPPORT LTD., Guangdong (CN); CHINA INTERNATIONAL MARINE CONTAINERS (GROUP) LTD., Guangdong (CN)

(72) Inventors: Lan Deng, Shenzhen (CN); Zhaohong Zhang, Shenzhen (CN); Wei Xiang, Shenzhen (CN); Yuefeng Yang, Shenzhen (CN); Haiqiu Liu, Shenzhen (CN); Haibin Wang, Shenzhen (CN)

(73) Assignees: Shenzhen CIMC-Tianda Airport Support Ltd., Shenzhen, Guangdong (CN); China International Marine Containers (Group) Ltd., Shenzhen, Guangdong (CN)

(*) Notice: Subject to any disclaimer, the term of this patent is extended or adjusted under 35 U.S.C. 154(b) by 116 days.

(21) Appl. No.: 15/329,994

(22) PCT Filed: Jul. 2, 2015

(86) PCT No.: PCT/CN2015/083206
§ 371 (c)(1),
(2) Date: Jan. 27, 2017

(87) PCT Pub. No.: WO2016/015547
PCT Pub. Date: Feb. 4, 2016

(65) Prior Publication Data
US 2017/0263139 A1    Sep. 14, 2017

(30) Foreign Application Priority Data
Aug. 1, 2014    (CN) .......................... 2014 1 0378566

(51) Int. Cl.
*G08G 5/06* (2006.01)
*G08B 5/06* (2006.01)
(Continued)

(52) U.S. Cl.
CPC ............. *G08G 5/065* (2013.01); *B64F 1/002* (2013.01); *B64F 1/18* (2013.01); *G06K 9/00624* (2013.01);
(Continued)

(58) Field of Classification Search
CPC .. B64F 1/002; B64F 1/00; G01S 17/06; G01S 17/88; G06K 9/00791; G06K 9/6202;
(Continued)

(56) References Cited

U.S. PATENT DOCUMENTS 5,675,661 A * 10/1997 Richman ................. B64F 1/002
340/958
5,734,736 A    3/1998 Palmer et al.
(Continued)

FOREIGN PATENT DOCUMENTS

CN    1399767 A    2/2003
CN    1300750 C    2/2007
(Continued)

OTHER PUBLICATIONS

Guo, Yanying, "Research on Key Technologies in Visual-based Aircraft Docking Automatic Guided", China Doctoral Dissertations, Oct. 2012.
(Continued)

*Primary Examiner* — Mekonen T Bekele
(74) *Attorney, Agent, or Firm* — Amster, Rothstein & Ebenstein LLP

(57) ABSTRACT

A machine vision-based method and system for aircraft docking guidance and aircraft type identification, comprising: S1: a monitoring scenario is divided into different
(Continued)

information processing function areas; S2: a captured image is pre-processed; S3: the engine and the front wheel of an aircraft are identified in the image, so as to confirm that the aircraft has appeared in the image; S4: continuous tracking and real-time updating are performed on the image of the engine and the front wheel of the aircraft captured in step S3; S5: real-time positioning of the aircraft is implemented and the degree of deviation of the aircraft with respect to a guide line and the distance with respect to a stop line are accurately determined; S6: the degree of deviation of the aircraft with respect to the guide line and the distance with respect to the stop line of step S5 are outputted and displayed.

22 Claims, 12 Drawing Sheets

(51) Int. Cl.
| G06K 9/36 | (2006.01) |
| G06T 7/194 | (2017.01) |
| G06T 7/73 | (2017.01) |
| G06T 7/11 | (2017.01) |
| G06T 7/174 | (2017.01) |
| G06T 7/90 | (2017.01) |
| B64F 1/18 | (2006.01) |
| G06K 9/00 | (2006.01) |
| G06K 9/34 | (2006.01) |
| G06K 9/46 | (2006.01) |
| G06K 9/38 | (2006.01) |
| G06K 9/52 | (2006.01) |
| G06K 9/62 | (2006.01) |
| G08G 5/00 | (2006.01) |
| G06T 7/136 | (2017.01) |
| B64F 1/00 | (2006.01) |
| H04N 7/00 | (2011.01) |

(52) U.S. Cl.
CPC ........... *G06K 9/00785* (2013.01); *G06K 9/34* (2013.01); *G06K 9/36* (2013.01); *G06K 9/38* (2013.01); *G06K 9/4638* (2013.01); *G06K 9/4642* (2013.01); *G06K 9/4661* (2013.01); *G06K 9/525* (2013.01); *G06K 9/6203* (2013.01); *G06T 7/11* (2017.01); *G06T 7/136* (2017.01); *G06T 7/174* (2017.01); *G06T 7/194* (2017.01); *G06T 7/74* (2017.01); *G06T 7/90* (2017.01); *G08B 5/06* (2013.01); *G08G 5/0026* (2013.01); *G06T 2207/10024* (2013.01); *G06T 2207/30236* (2013.01); *G06T 2207/30252* (2013.01); *H04N 7/00* (2013.01)

(58) Field of Classification Search
CPC .. G06K 9/20; G06K 9/36; G06K 9/60; G08G 5/06; G08G 5/065; H04N 7/00
See application file for complete search history.

(56) References Cited

U.S. PATENT DOCUMENTS

| 6,100,964 | A | * | 8/2000 | De Cremiers | B64F 1/002 |
| | | | | | 340/958 |
| 6,353,793 | B1 | * | 3/2002 | Godwin | G01M 1/125 |
| | | | | | 701/120 |
| 6,614,469 | B1 | * | 9/2003 | Kato | G05D 1/0246 |
| | | | | | 348/148 |
| 2002/0030609 | A1 | | 3/2002 | Baumgartner et al. | |
| 2002/0099497 | A1 | * | 7/2002 | Godwin | G01M 1/125 |
| | | | | | 701/124 |
| 2003/0160709 | A1 | | 8/2003 | Westlund | |
| 2015/0253773 | A1 | * | 9/2015 | Cox | G05D 1/0083 |
| | | | | | 701/3 |

FOREIGN PATENT DOCUMENTS

| CN | 101739694 A | 6/2010 | | |
| CN | 103049788 A | 4/2013 | | |
| CN | 103177586 A | 6/2013 | | |
| EP | 0883873 B1 | 12/1999 | | |
| EP | 2109065 A2 | 10/2009 | | |
| ES | 2206016 A1 | * | 5/2004 | |
| ES | 2206016 A1 | * | 5/2004 | |
| JP | 08036699 A | 2/1996 | | |
| KR | 20090082546 A | 7/2009 | | |
| WO | 2013141605 A | 9/2013 | | |
| WO | WO 201314160 A1 | * | 9/2013 | G01S 17/06 |
| WO | WO-2013141605 A1 | * | 9/2013 | G01S 17/06 |

OTHER PUBLICATIONS

Extended European Search Report dated Jun. 7, 2018—EP Application No. 15828078.4-1207.
Li, et al. "Shape Retrieval Based on Distance Ratio Distribution" Intelligent Enterprise Technologies Lab, HP Laboratories Palo Alto (Georgia Institute of Technology/HP Labs) Jul. 30, 2002 (12 pgs.).
Olivo, J. "Automatic Threshold Selection Using the Wavelet Transform" Graphical Models and Image Processing, vol. 36, No. 3, May 1994 (205-218 pp).
Tsai, et al. "Fast Geometric Re-Ranking for Image-Based Retrieval" 17th International Conference on Image Processing; Sep. 2010 (1029-1032 pp).
Huang, et al. "Analysis of Hu's Moment Invariants on Image Scaling and Rotation" 2010 2nd International Conference on Computer Engineering and Technology; vol. 7 (476-480 pp).
Kong, et al. "A new shape descriptor based on centroid-radii model and wavelet transform" Optics Communications (vol. 273) 2007 (362-366 pp).
European Supplementary Partial Search Report dated Feb. 2, 2018—EP Application No. 15828078.4-1207.
Garg, K., et al.—"Detection and Removal of Rain from Videos" Computer Society Conference on Computer Vision and Pattern Recognition (CVPR'04) 2004—pp. 1063-1070.
Jha, R., et al.—"Entropy-Based Rain Detection and Removal" International Conference on Control, Automation, Robotics and Embedded Systems (CARE) 2013 pp. 978-981.
Ji-hong, Z., et al.—"Research of Moving Distance Measurement and Display in Aircraft Docking System" Journal of Machine Design, vol. 28, No. 12, Dec. 28, 2011 pp. 90-92.
Ma, Z., et al.—"Video Image Clarity Algorithm Research of USV Visual System under the Sea Fog" College of Automation, Harbin Engineering University, (ICSI 2013, Part II, LNCS 7929) 2013 pp. 436-444.

* cited by examiner

MACHINE VISION-BASED METHOD AND SYSTEM FOR AIRCRAFT DOCKING GUIDANCE AND AIRCRAFT TYPE IDENTIFICATION

CROSS-REFERENCE TO RELATED APPLICATIONS

The present application is based upon and claims priority to Chinese Patent Application No. 201410378566.8 filed on Aug. 1, 2014, the entire contents of which are incorporated herein by reference.

TECHNICAL FIELD

The present disclosure relates to a method for aircraft docking guidance and aircraft type identification, and more particularly to a machine vision-based method and a machine vision-based system for aircraft docking guidance and aircraft type identification.

BACKGROUND

Aircraft docking berth guidance refers to the process of bringing an arriving aircraft from the end of the taxiway to the parking position of the apron and accurately anchoring it. The aim of the berth guidance is to ensure the safe and accurate berthing of the docked aircraft, to facilitate the accurate docking of the airplane and various ground interfaces, and to make the boarding bridge to accurately abut to the aircraft door to improve the efficiency and safety of the airport.

An automated aircraft berth guidance system according to the use of different types of sensors is mainly divided into: (1) a buried coil type; (2) a laser-scan ranging type; (3) a visual perception type.

Since the laser-scan ranging type and the visual perception type of automated aircraft guidance systems can effectively acquire visual information for docking an aircraft, the two types of automatic aircraft berth guidance systems may be also known as visualization berth guidance systems.

The buried induction coil type of automatic guidance system may determine the location of the docked aircraft by detecting whether there is a metal object passing through or staying at the buried induction coil. The buried induction coil has following advantages: fast response, low cost, no requirements on weather and illumination conditions. However, the buried induction coil suffers from large error, low anti-jamming capability. Moreover, leads and electronic components buried in the ground tend to be crushed, have low reliability, low measurement accuracy, and cannot identify a model type and cannot be easily debugged or maintained.

The laser-scan ranging type of automatic guidance system may determine information such as an aircraft position, speed and type model by laser ranging and laser scanning. The laser-scan ranging type of automatic guidance system does not tend to be influenced by environment illumination and weather condition. The laser-scan ranging type of automatic guidance system has a high accuracy and may be easily debugged or maintained.

The visual perception type of automatic guidance system may acquire image information of an aircraft docketing process by optical imaging, and determine information such as an aircraft position, speed and type model by intelligent information processing technology. The system has a simple architecture, a low cost and a high intelligent level, and may be easily debugged or maintained. However, it has requirements on the weather and illumination conditions, and thus has poor adaptability.

With the development of visual perception imaging technology, intelligent information processing technology and computer technology, visualization of aircraft berth guidance technology can accurately and quickly obtain docking information of docked aircraft, which has been applied in an airport berth guidance system.

Honeywell corporation in US has developed a visual docking guidance system (VDGS) and Siemens corporation in Germany has developed a video docking guidance system (VDOCKS), they have been applied as visual guidance devices of a worldwide leading level in some international airports.

However, the accuracy of aircraft acquisition, tracking and positioning, model type identification and identity verification in aircraft docking demands to be further improved.

SUMMARY

The technical problem to be solved by the present disclosure is to realize aircraft docking guide in a visual way, which can effectively improve the accuracy of aircraft acquisition, tracking and positioning during an aircraft docking process.

Further, the functions of model identification and identity verification can be realized.

Further, it can effectively improve automation, intelligence and operational management level of a civil aviation airport.

In order to solve the above problems, the present disclosure provides a method for guiding an aircraft docking and recognizing an aircraft model based on machine vision, the method including:

step S1, a step for configuring an aircraft berthing scene, in which a monitored scene is divided into regions for separate data processing;

step S2, an image pre-processing step, in which a captured image is pre-processed;

step S3, an aircraft capturing step, in which it is determined that an aircraft exists in the image by recognizing an engine and front wheels of the aircraft in the image;

step S4, an aircraft tracking step, in which the image of the engine and the front wheels of the aircraft recognized in step S3 is continuously tracked and updated in real time;

step S5, an aircraft positioning step, in which the aircraft is positioned in real time, and a deviation degree of the aircraft from a guide line and a distance between the aircraft and a stop line are accurately determined; and step S6, an information displaying step, in which the deviation degree of the aircraft from the guide line and the distance between the aircraft and the stop line determined in step S5 are outputted and displayed.

The image pre-processing step further includes:

step S21, determining whether the image is an image of low illumination, high illumination or normal illumination according to an average of gray scales of the image, performing a step for processing a low-illumination image on the image if the image is an image of low illumination, and performing a step for processing a high-illumination image on the image if the image is an image of high illumination;

step S22, if the image is an image of normal illumination, determining whether the image is a normal image according to a variance of the gray scales of the image; and step S23, if the image is not a normal image, determining whether the image is an image captured in rain or snow or an image captured in fog, performing a step for processing a rain-or-snow image on the image if the image is an image captured in rain or snow, and performing a step for processing a fog image on the image if the image is an image captured in fog.

The step for processing a low-illumination image includes processing the image with the following formula:

$$g(x,y)=f(x,y)+af(x,y)(255-f(x,y))$$

where f(x, y) represents the image before the step for processing a low-illumination image, (x, y) represents coordinates of a pixel in the image, g(x, y) represents the image after the step for processing a low-illumination image, and a represents a parameter for processing a low-illumination image.

The step for processing a rain-or-snow image includes:

searching in the image for a pixel to be processed which is contaminated by rain or snow by using a photometric model;

for a pixel to be processed in the present image, extracting luminance values of corresponding pixels in a previous image and in a subsequent image of the present image, determining whether the corresponding pixels in the previous image and in the subsequent image of the present image are pixels to be processed according to the extracted luminance values, if the corresponding pixels are pixels to be processed, calculating an average value of the luminance values of the corresponding pixels and replacing a luminance value of the pixel to be processed in the present image with the average value, and if the corresponding pixels are not pixels to be processed, replacing a luminance value of the pixel to be processed in the present image with a minimum value of the luminance values of the corresponding pixels or an average value of two smallest luminance values of the corresponding pixels.

The fog image processing step is performed by homomorphic filtering.

The aircraft capturing step further includes:

step S31, a background elimination step, in which a dynamic distribution of a background in the scene is simulated with a single Gaussian background model, a model of the background is established and the present image and the background model are differentiated to eliminate the background to obtain a foreground region;

step S32, a shade elimination step, gray values of respective pixels in the foreground region are computed to find the maximum gray value g max and the minimum gray value g min thereof, and shading elimination is performed on the regions with gray values lower than T=g min+(g max−g min)*0.5;

step S33, a region classification step, in which a template of a standard front view of an aircraft region is created, a target region is extracted through change detection, and a vertical projection curve of the target region is calculated, a correlation coefficient between the vertical projection curve of the target region and a vertical projection curve of the template of the standard front view of the aircraft region is calculated, if the correlation coefficient is larger than or equals to a classification threshold, the target region is determined as an aircraft;

step S34, a feature verification step, in which it is further determined whether the target region is an aircraft by detecting the recognized engine and front wheel of the aircraft.

The feature verification step further includes:

step S341, extracting a blackest image region, in which a gray scale histogram of the target region of a current frame of image is made, the maximum gray value and the minimum gray value are acquired in a gray level range of 1% to 99%, the darkest part of the image is extracted from the image by means of the maximum gray value, the minimum gray value and a preset threshold for judging a blackest part, to obtain a darkest region;

step S342, circular-like detection, in which all outer boundaries of the blackest region are extracted, and for each boundary, a gravity center coordinate of the boundary is calculated with a moment of the boundary, a ji$^{th}$-order of the moment $m_{ji}$ of the boundary is defined as follows:

$$m_{ji} = \sum_{x,y}(f(x,y)x^j y^i)$$

the gravity center coordinate $(\bar{x}, \bar{y})$ is:

$$\bar{x} = \frac{m_{10}}{m_{00}}, \bar{y} = \frac{m_{01}}{m_{00}}$$

for all pixel points of the current boundary, a distance from each pixel to the gravity center is calculated, if a ratio of the maximum value of the calculated distances and the minimum value of the calculated distances exceeds a threshold for determining a circle, it is determined that the boundary does not correspond to a circular region and a next boundary is determined; otherwise, if the ratio of the maximum value of the calculated distances and the minimum value of the calculated distances does not exceed the preset value, it is determined that the boundary corresponds to a like-circular region and the gravity center coordinate and a radius of the like-circular region are recorded;

step S343, it is determined whether there is an engine in the like-circular regions by calculating similarity; and step S344, detecting a front wheel of the aircraft.

In the step S343, for M detected like-circular regions, a similarity degree Similarity$_{ij}$ between an i$^{th}$ like-circular region and a j$^{th}$ like-circular region is calculated as:

$$Similarity_{ij}=|Height_i-Height_j|*|Radius_i-Radius_j|$$

where Height is a height of the gravity center, and Radius is the radius, when the similarity degree Similarity$_{ij}$ is less than a preset similarity threshold, it is determined that the like-circular regions i and j are the aircraft engine.

In the step S343, if no aircraft engine is detected, the detection in the steps S341-343 are performed iteratively, with the threshold for judging a blackest part, the threshold for determining a circle and the similarity threshold being increased; if after that, still no aircraft engine is detected, an open operation is performed for all the blackest regions using a circular template of 7*7, and the steps S341-343 are performed for another time;

if still no aircraft engine is detected, the above detection steps are performed iteratively for another 2 times; and if still not aircraft engine is detected, it is determined that there is no engine in the image.

The threshold for judging a blackest part, the threshold for determining a circle and the similarity threshold are increased respectively by 0.05, 0.5 and 20.

The step S344 further includes:

in the search region, 256 levels of grayscale are quantized to 64 levels, a first peak and a first valley are searched out in the histogram of the 64 levels of grayscale after the quantization, the optimal peak position BestPeak and the optimal valley position BestValley in the original histogram of the 256 levels of grayscale are defined as:

$$BestPeak = \underset{peak*4-4 \leq i \leq peak*4+3}{\mathrm{argmax}} \{hist_{256}(i)\}$$

$$BestValley = \underset{BestPeak<i \leq valley*4+3}{\mathrm{argmin}} \{hist_{256}(i)\}$$

where hist256(i) represents a total number of pixels having a grayscale i in the histogram of the 256 levels of grayscale;

the grayscale is partitioned according to the optimal valley BestValley, for a part smaller than the optimal valley BestValle, trivial points with small areas are removed, and a closing operation is performed on the image with a flat elliptical structure element;

7th-order Hu moments of boundaries are calculated for all graphs after the closing operation and compared with Hu moments of a preset standard front wheel model, and if the similarity between them is less than a threshold, it is determined that the middle one is the front wheel.

The aircraft tracking step further includes:

step S41, after a position of an engine in a previous frame of image is obtained, a region of an engine in a current frame of image is determined and tracked using a flood filling method;

step S42, if filling result of the step S41 is invalid, a dark environment detection and tracking step is performed to detect and track the engine region with parameters used in processing the previous frame of image;

step S43, after information about a region of an engine is acquired, the front wheel of the aircraft is detected with the step S344; and step S44, a front wheel tracking emergency processing step, in which when it is determined that the region of the front wheel has an incorrect shape, or the position of the front wheel deviates significantly from that in the previous frames of images, from information of the previous frame of image and the current frame of image, a shift of the front wheel in the frame is estimated using a shift of an engine in adjacent two frames, the estimated result is taken as a front wheel tracking result, and if it is not detected in more than N frames of images, an error message is outputted.

The aircraft positioning step includes:

step S51, a photographing device calibration and image correction step, configured to determine optical parameters of a photographing device and orientation of the photographing device with respect to the world coordinate system;

step S52, an aircraft front wheel deviation degree calculating step; and step S53, an aircraft front wheel actual distance calculating step.

The step S51 further includes:

step S511, retrieving N calibration pictures;

step S512, a corner of a chessboard is found by using a function cvFindChessboardCorners ( ) of OpenCV, the retrieved N calibration pictures are respectively substituted to the function cvFindChessboardCorners ( ); if all the corners are successfully found, the function returns 1, and coordinates of the corners in the image coordinate system are acquired; and if it is not successful, the function returns 0; and step S513, coordinates of the corners which are successfully searched out in the calibration template are substituted into the function cvCalibrateCamera2( ) and the function returns a parameter matrix, a distortion coefficient, a rotation vector and a translation vector of the photographing device.

The step S52 further includes:

according to the coordinates $(x_0, y_0)$ of the position of the front wheel obtained in the step S43, by utilizing a relationship between the coordinates of the position and the stop line, a linear equation of the guide line is calculated as $y_1=k_1x_1+b_1$, and a linear equation of the stop line is calculated as $y_2=k_2x_2+b_2$, and a distance from the point of the coordinate to the straight line is:

$$d = \frac{kx - y + b}{\sqrt{k^2 + 1}},$$

the coordinates $(x_0, y_0)$ are substituted into the two linear equations to obtain $d_1$ and $d_2$, $d_2 \geq 0$ means that the front wheel of the aircraft exceeds the stop line, $d_2<0$ means that the front wheel of the aircraft dose not reach the stop line; at this time, if $k_1>0$ $d_1>0$, it means that the aircraft is deviated to left, and $d_1<0$ means that the aircraft is deviated to right; and if $k_1>0$, $d_1<0$, it means that the aircraft is deviated to left, and $d_1>0$ means that the aircraft is deviated to right.

The step S52 further includes:

it is determined whether $|d_1|>$width/2 is satisfied, where width is a threshold equal to a width of a front wheel of an aircraft detected; if $|d_1|>$width/2 is satisfied, it means that the aircraft has deviated from the guide line.

The step S53 further includes:

a corresponding relationship between image coordinates and geodetic coordinates is established;

image coordinates are obtained from the mark points in the configuration of the scene at the step S1, quadratic curve fitting is performed on the image coordinates with a least squares method, to obtain a curve equation $y=ax^2+bx+c$, wnere x is a distance in the image, y is an actual distance;

the front wheel of the aircraft on the image is projected on the guide line along a direction of the stop line, an Euclidean distance from the projection point to the stop line is denoted by x, and the actual distance from the front wheel of the aircraft to the stop line is obtained from $y=ax^2+bx+c$.

After the step S3, step S7 is performed, the step S7 is an aircraft identification and identity verification step and further includes:

step S71, parameter verification, in which parameters of the aircraft in the image are extracted and compared with parameters of a corresponding model type preset in a database, to obtain a model similarity degree;

step S72, template matching, in which the image is compared with a model template preset in the database, to obtain a template similarity degree;

step S73, comprehensive judgment, in which when the model similarity degree and the template similarity degree are larger than or equal to a verification threshold, it is deemed that the identity verification is passed.

The step S71 further includes:

step S711, parameters of the aircraft engine in the image are extracted and compared with parameters of the aircraft engine of a corresponding model type preset in a database, to obtain a first ratio;

step S712, the aircraft wing parameters in the image are extracted and compared to aircraft wing parameters of the corresponding model preset in the database, to obtain a second ratio;

step S713, parameters of aircraft head in the image are extracted and compared with parameters of aircraft head corresponding to the model type preset in the database, to obtain a third ratio;

step S714, parameters of the aircraft tail in the image are extracted and compared with aircraft tail parameters preset to the corresponding model type in the database, to obtain a fourth ratio;

step S715, a minimum value and a maximum value among the first ratio, the second ratio, the third ratio, and the fourth ratio are taken, and the ratio of minimum/maximum is taken as the model similarity degree.

The step S72 further includes:

step S721, global template matching, in which a global template similarity degree is calculated by taking the whole image as the image to be searched and the standard aircraft image as the template;

step S722, local template matching, in which with the aircraft engine, the aircraft wings, the aircraft head, and the aircraft tail respectively extracted in the steps S711-S714 as the images to be searched, and the engine, the wings, the head and the tail of the standard aircraft image as templates, 4 similarity degrees between the images to be searched and the templates are calculated, a minimum value of the 4 similarity degrees is removed, and an average of the remaining 3 similarity degrees of the 4 similarity degrees is taken as a local template similarity degree.

The step S73 further includes: if at least two of the model similarity degree, the global template similarity degree and the local template similarity degree are larger than or equal to a first verification threshold, it is deemed that the identity verification is passed, or, if each of the model similarity degree, the global template similarity degree and the local template similarity degree is larger than a second verification threshold, it is deemed that the identity verification is passed.

The present disclosure also discloses a system for guiding an aircraft docking and recognizing an aircraft model based on machine vision, the system including:

a unit for configuring an aircraft berthing scene, configured to divide a monitored scene into regions for separate data processing;

an image pre-processing unit, configured to pre-process a captured image;

an aircraft capturing unit, configured to determine that an aircraft exists in the image by recognizing an engine and front wheels of the aircraft in the image;

an aircraft tracking unit, configured to continuously track and update in real time the image of the engine and the front wheels of the recognized aircraft;

an aircraft positioning unit, configured to position the aircraft in real time, and accurately determine a deviation degree of the aircraft from a guide line and a distance between the aircraft and a stop line; and an information displaying unit, configured to output and display the deviation degree of the aircraft from the guide line and the distance between the aircraft and the stop line.

In summary, the present disclosure can realize the acquisition, tracking, positioning and identity verification of the aircraft in the process of aircraft docking, and display the airplane berth guidance information to provide correct information and effective berth guidance for the aircraft pilot, co-pilot or other personnel, so that the aircraft may achieve safe and effective berth, improving the efficiency of airport operations to ensure safety.

DETAILED DESCRIPTION

Hereinafter, detailed description of the configuration and operation principle of the present disclosure will be given with reference to the accompanying drawings.

Figure 1:
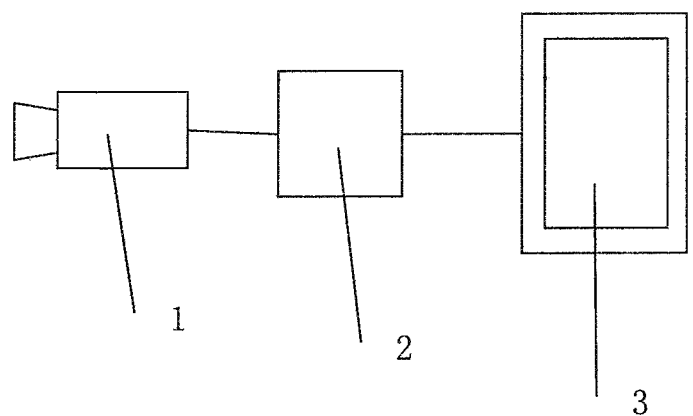
FIG. 1 is a block diagram of a machine vision-based system for aircraft docking guidance and aircraft type identification according to an embodiment of the present disclosure.
Figure 2:
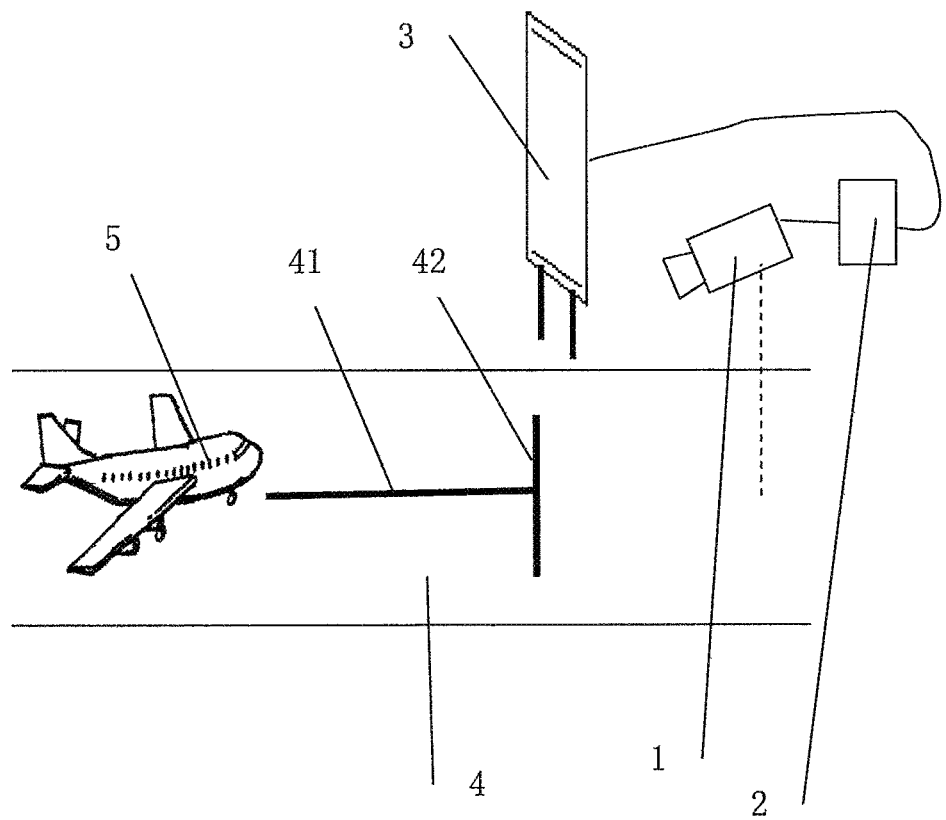
FIG. 2 is a schematic diagram of aircraft docking guidance according to the present disclosure.

Referring to FIGS. 1 and 2, FIG. 1 is a block diagram of a machine vision-based system for aircraft docking guidance and aircraft type identification according to an embodiment of the present disclosure, and FIG. 2 is a schematic diagram of aircraft docking guidance according to the present disclosure.

The machine vision-based system for aircraft docking guidance and aircraft type identification according to the present disclosure mainly consists of a photographing device 1, a central processing device 2 and a display device 3. The photographing device 1 is coupled to the central processing device 2, and the central processing device 2 is coupled to the display device 3. The photographing device 1 is configured to send a photographed image to the central processing device 2, and the central processing device 2 is configured to send contents to be displayed which contains guidance information to the display device 3.

In the embodiment, the photographing device 1 is installed behind a stop line 42 of an aircraft berth ground 4, preferably aiming at a guide line 41, with a height of the installation place higher than the body of an aircraft 5 for about 5-8 m preferably. In FIG. 2, a dash line connected to the photographing device 1 represents that the photographing device 1 is installed right above the ground. The central processing device 2 may be a calculating device which is capable of receiving data, processing data, storing data, generating image data to be displayed and sending data, and include functional modules configured to perform aircraft berthing scenario configuration, video image pre-processing, aircraft capturing, aircraft tracking, aircraft positioning, aircraft identification and identity verification and information displaying, all of which are installed in the central processing device 2 as software. Preferably, the display device 3 is a large-size information display screen installed in the airport, for aircraft drivers to watch. In addition, an airport staff may also carry a hand-held display device to watch a condition of an aircraft.

Figure 3:
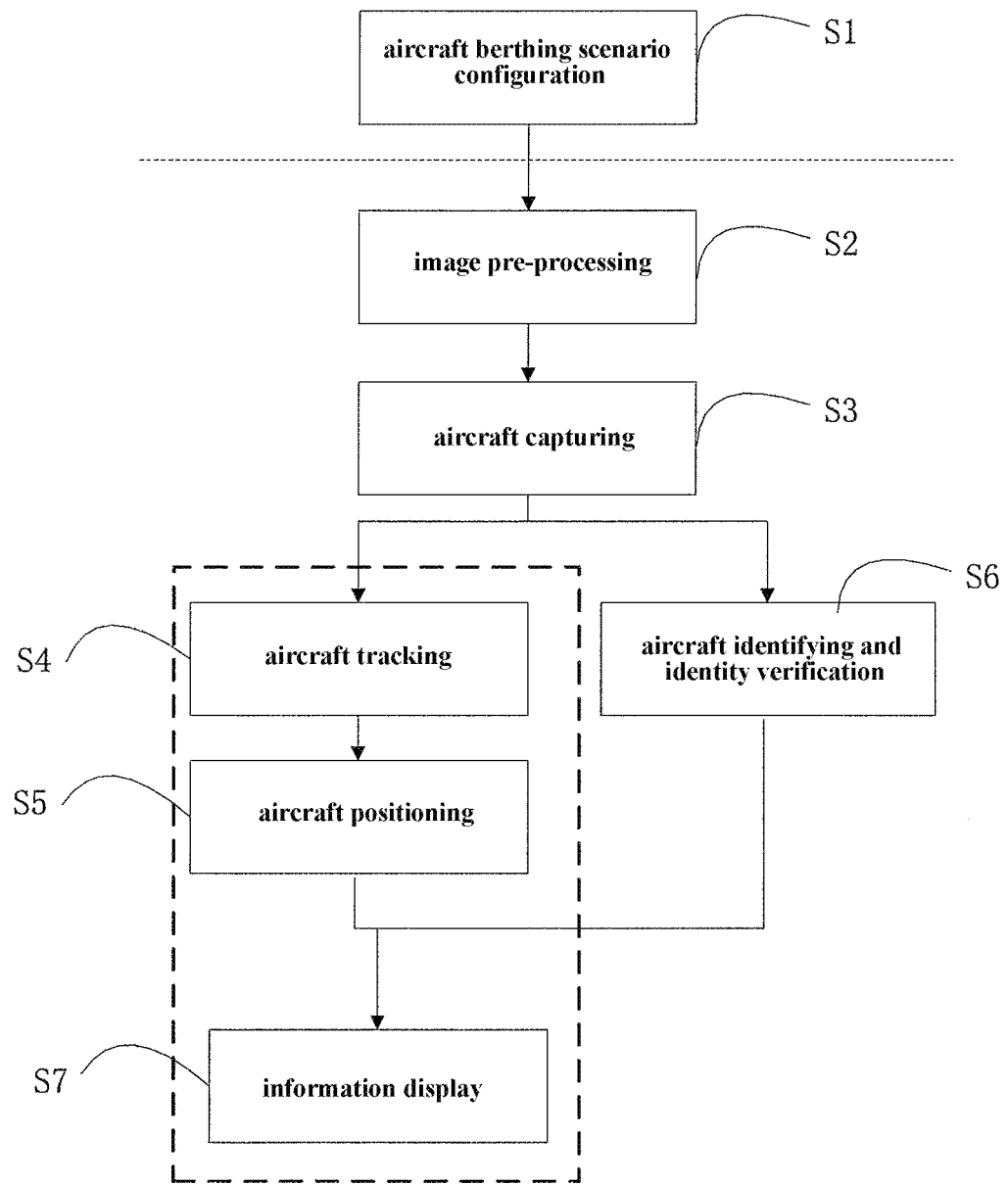
FIG. 3 is a flowchart of aircraft docking guidance and aircraft type identification according to the present disclosure.

Referring to FIG. 3, FIG. 3 is a flowchart of aircraft docking guidance and aircraft type identification according to an embodiment of the present disclosure. The machine vision-based method for aircraft docking guidance and aircraft type identification of the present disclosure includes the following steps.

Step S1 is to configure the aircraft berthing scenario.

Since an aircraft will travel a relatively long distance from just entering a berth to finally stopping, the aircraft docking guidance process may be divided into several phrases and each of the phrases has different monitoring content. That is to say, the aircraft berthing scenario requires to be configured in advance.

At step S1, a monitoring scenario of the aircraft berth ground 4 is divided into various information processing functional regions, in order to narrow a scope of a region for image processing and improve the processing efficiency.

Firstly, the monitoring scenario of the aircraft berth ground 4 requires definition. A scale with alternating black and white segments is placed adjacent to the guide line 41. Each black segment has a length identical to that of each white segment. Each segment may have a maximum length of 1 m. However, the length of each segment may be smaller, such as 0.5 m, 0.25 m, and so on, depending on the resolution of the photographing device. A total length of the scale does not exceed a scope for calculating a distance of the position of the aircraft, generally is 50 m.

The monitoring scenario may be reproduced through the software executed in the central processing device 2. A picture of the aircraft berth ground 4 which is captured by the photographing device 1 may be displayed by running the software. A relevant region may be marked by manually drawing a line, a box and a dot and the marks in the relevant region may be stored and recorded.

Figure 4:
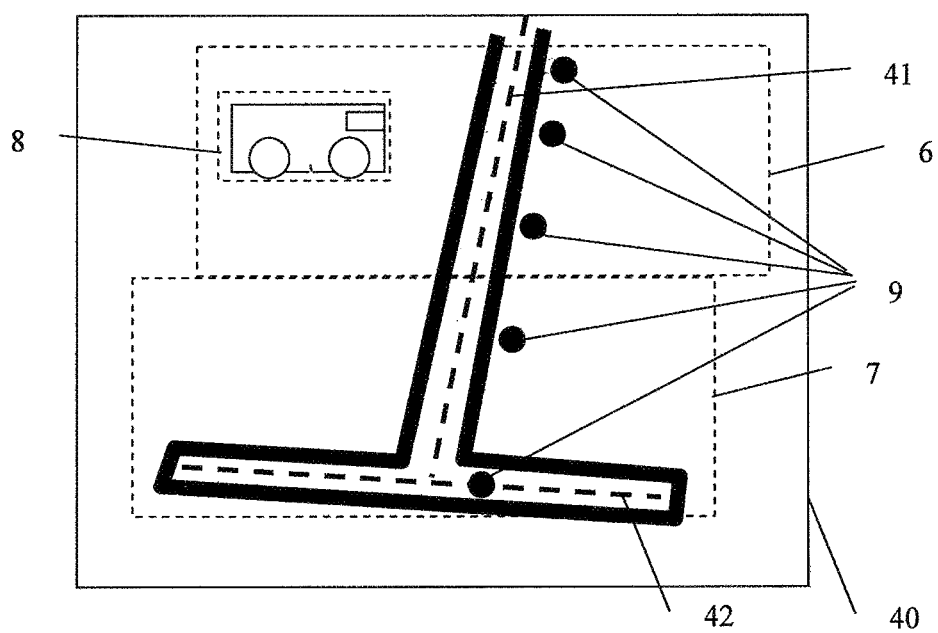
FIG. 4 is a schematic diagram of an aircraft berth scene setting according to the present disclosure.

The photographing device 1 captures a scenario image of the aircraft berth ground 4 when no aircraft is parked, and transmits the image to the central processing device 2. The aircraft berthing scenario configuration is as shown in FIG. 4. In FIG. 4, a box 40 represents a picture displayed for mark operation and a region used for depiction. Dash-line boxes in FIG. 4 represent positions for manual depiction. Lines may be manually drawn on the displayed image. In FIG. 4, a guide line 41 and a stop line 42 are respectively marked, and the position information of the guide line 41 and the stop line 42 in the image is stored and recorded. By manually drawing boxes, a capturing region 6, a tracking and positioning region 7 and a relevant ground-service device region 8 are marked. The position information of the capturing region 6 and the tracking and positioning region 7 in the image is stored and recorded. The aircraft type recognition and identity recognition region and the tracking and positioning region 7 may correspond to the same region. Then, by manually drawing dots based on the scale placed in the scenario, all dots 9 may be marked beside and adjacent to the guide line 41 with a maximum interval of 1 m. The position information of all of the dots 9 in the image as well as a distance of each of the dots from a first dot 91 in the actual scenario are stored and recorded.

In the embodiment, for marking the guide line 41, the stop line 42 and the dots 9, the portion of the image to be marked may be enlarged to dozens of pixels wide, and then the manual marking may be conducted in the enlarged portion to improve the accuracy in marking. The marked capturing region 6 and the tracking and positioning region 7 do not strictly require accuracy. It will suffice that an upper edge of the capturing region 6 is positioned about 100 m away from the stop line 42 in the actual scenario, and a lower edge of the capturing region 6 is positioned about 50 m away from the stop line 42 in the actual scenario; and an upper edge of the tracking and positioning region 7 is positioned about 50 m away from the stop line 42 in the actual scenario, and a lower edge of tracking and positioning region 7 is positioned just anywhere below the stop line 42.

In FIG. 3, the step S1 above the dash line is performed after the system is installed and before the docking guidance. Steps below the dash line are all performed during the docking guidance. Steps in the dash-line box are performed in real time and updated during the docking guidance.

Figure 5A:
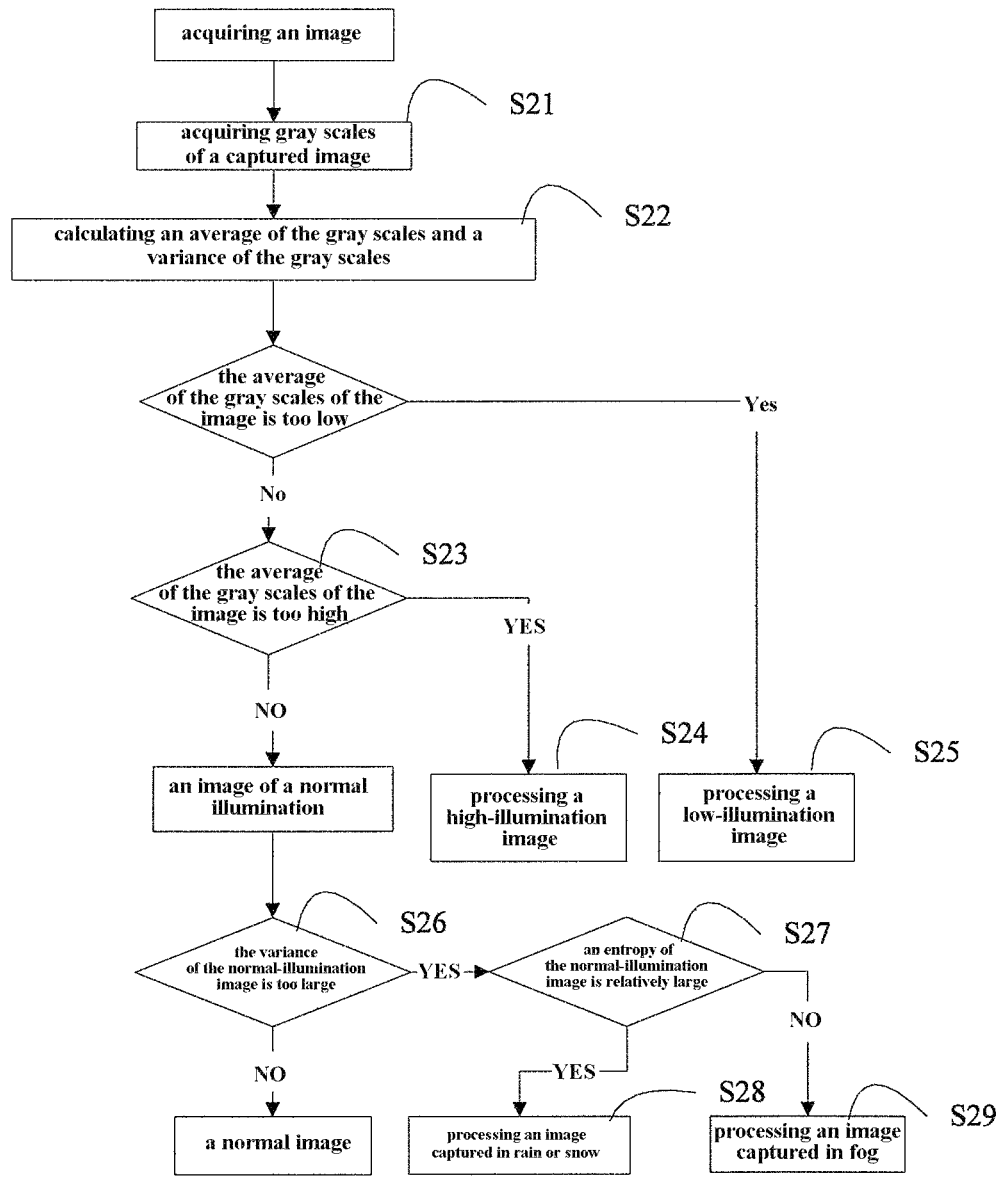
FIGS. 5A, 5B show a detailed flow chart of the image preprocessing step.
Figure 5B:
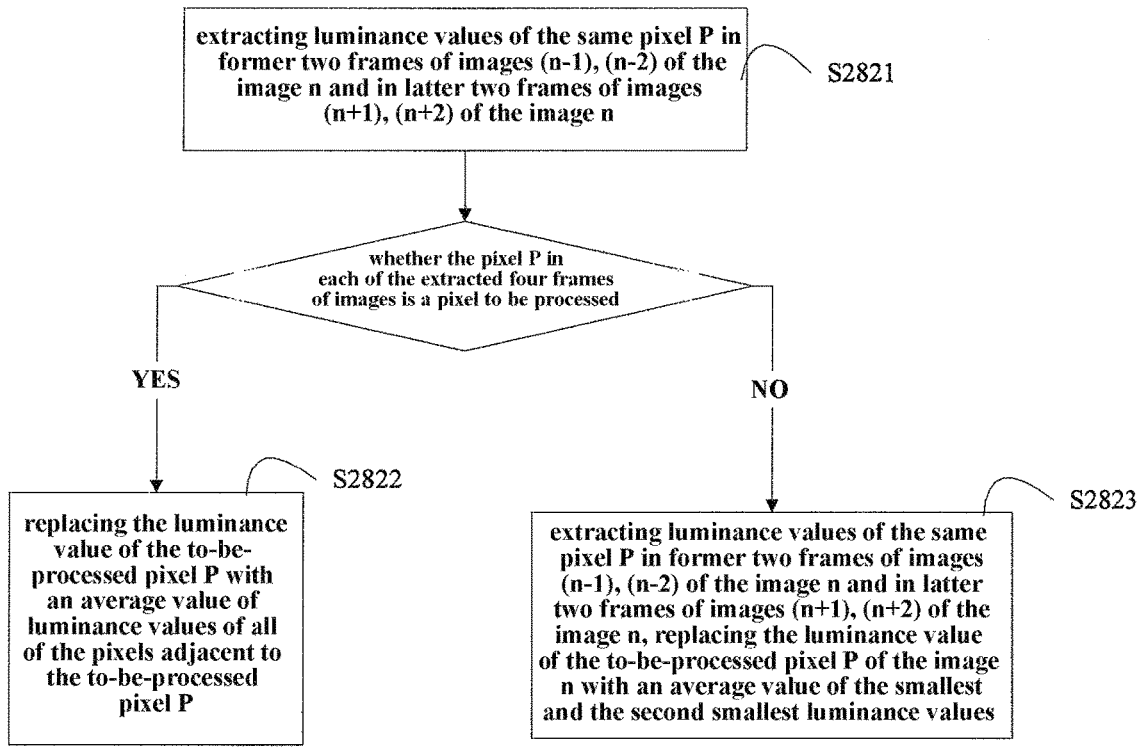

Step S2 is performed after step S1. Step S2 is an image pre-processing step. FIGS. 5A and 5B illustrates a detailed flowchart of the image pre-processing step.

The photographing device 1 captures images of the capture region 6 in real time. For each captured image, step S2 and steps subsequent to step S2 are performed.

Step S2 further includes the following steps.

At step S21, gray scales of a captured image are acquired.

At step S22, an average of the gray scales and a variance of the gray scales are calculated, and it is determined whether the average of the gray scales of the image is smaller han a lower limit value. If the average of the gray scales of the image is smaller than the lower limit value, it means that the image is an image of a low illumination and step S25 of processing a low-illumination image is performed. If the average of the gray scales of the image is not smaller than the lower limit value, step S23 is performed.

The lower limit value is set in advance, and may be a value between 50-60.

At step S23, it is determined whether the average of the gray scales of the image is larger than an upper limit value. If the average of the gray scales of the image is larger than the upper limit value, it means that the image is an image of a high illumination and step S24 of processing a high-illumination image is performed. If the average of the gray scales of the image is not larger than the upper limit value, it means that the image is an image of a normal illumination, and step S26 is performed.

The upper limit value may be set in advance, and may be a value between 150-160. An image with an average gray scale between the upper limit and the lower limit is an image of a normal illumination.

Step 24 is a step for processing a high-illumination image.

At step 24, a high-illumination image is processed to have a decreased illumination with gamma transformation.

Step 25 is a step for processing a low-illumination image.

In the present disclosure, a low-illumination image is processed with non-linear transformation. The transformation formula is as follows:

$$g(x,y)=f(x,y)+af(x,y)(255-f(x,y))$$

Where, f(x, y) is the original image, (x,y) is a coordinate of a pixel point in the image, g(x, y) is the processed image, a is a parameter for processing the low-illumination image, and a may be 0.01.

At step S26, for an image of a normal illumination, it is determined whether the variance of the normal-illumination image is larger than a variance standard value. If the variance of the normal-illumination image is larger than the variance standard value, it means that the normal-illumination image may be an image captured in rain, snow or fog, and step S27 is performed. If the variance of the normal-illumination image is not larger than the variance standard value, it means that the normal-illumination image is not an image captured in rain, snow or fog, but a normal image, and no processing is needed.

At step S27, it is determined whether an entropy of the normal-illumination image is larger than an entropy threshold value. If the entropy of the normal-illumination image is larger than the entropy threshold value, it means that the normal-illumination image may be an image captured in rain or snow, and step S28 of processing an image captured in rain or snow is performed. If the entropy of the normal-illumination image is not larger than the entropy threshold value, it means that the normal-illumination image may be an image captured in fog, and step S29 of processing an image captured in fog is performed.

The entropy is a mathematical variable and generally represents an amount of information. For an image, the entropy represents an amount of details in the image, that is an amount of information contained in the image. In an image captured in rain or snow, due to the presence of rain or snow, rain drops and snowflakes appear at various positions, such that the amount of details of the image is relatively large. While in an image of captured in fog, due to the unifotin distribution of the fog, it appears that the amount of the details of the image is relatively small. Therefore, the entropy may be used to distinguish an image captured in rain or snow from an image captured in fog.

In an embodiment, for a gray scale image, an average neighborhood gray scale of the image is taken as a spatial characteristic quantity of the distribution of the gray scales. The spatial characteristic quantity and the gray scale of a pixel form a characteristic two-dimensional group, represented as (i, j), where, i represents a gray scale value of the pixel (0<=i<=255), j represents an average neighborhood gray scale (0<=j<=255), f(i, j) is a frequency of a characteristic two-dimensional group (i, j), N is a size of the image, $p_{ij}=f(i,j)/N^2$. Then, a two-dimensional entropy of a gray-scale image may be calculated as $$H = \sum_{i=0}^{256} p_{ij} \log p_{ij}.$$

Step S28 is a step for processing a rain-or-snow image.

At the step for processing a rain-or-snow image, linear correlation of the luminance is determined by utilizing a photometric model of the pixels in an image sequence, in order to remove the influence of rain or snow to the image.

An image captured in rain or snow may have the following photometric model.

Assuming that the current weather is rain or snow and the background does not change, in three frames (n−1, n, n+1) of images captured successively at the same position, the corresponding pixel point P has luminance values of $I_{n-1}$, $I_n$, $I_{n+1}$ which satisfies the following conditions.

The luminance value $I_{n-1}$ of the (n−1)$^{th}$ frame is equal to the luminance value $I_{n+1}$ of the (n+1)$^{th}$ frame, and in the n$^{th}$ frame, a luminance varying value ΔI caused by the rain or snow satisfies the following condition:

$$\Delta I = I_n - I_{n-1} = I_n - I_{n+1} \geq c$$

where, c represents a lower limit of the luminance value caused by the rain or snow.

Therefore, at step S28, the method further includes the following steps.

At step S281, a pixel that is contaminated by rain or snow and to be processed is searched for by utilizing the photometric model.

That is, for a pixel point P of a current image n, it is determined whether $I_{n-1}$ equals to $I_{n+1}$, and whether ΔI is larger than or equals to c. If $I_{n-1}$ equals to $I_{n+1}$ and ΔI is larger than or equals to c, it may be determined that the pixel point P of the image n is a pixel to be processed. The above determination is made for all pixels in the image n, until all of the pixels to be processed are searched out.

At step S282, luminance values of all of the pixels to be processed are adjusted.

Step S282 may further include the following steps.

At step S2821, for a to-be-processed pixel P of the image n, it is extracted luminance values of the same pixel P in former two frames of images (n−1), (n−2) of the image n and in latter two frames of images (n+1), (n+2) of the image n. It is determined whether the pixel P in each of the extracted four frames of images is a pixel to be processed. If the pixel P in each of the frames is a pixel to be processed, step S2822 is performed, otherwise step S2823 is performed.

At S2822, an average value of luminance values of all of the pixels adjacent to the to-be-processed pixel P is calculated, and the luminance value of the to-be-processed pixel P is replaced with the average value, in order to eliminate the influence of the rain or snow to the luminance of the image.

At step S2823, for a to-be-processed pixel P of the image n, it is extracted luminance values of the same pixel P in fonner two frames of images (n−1), (n−2) of the image n and in latter two frames of images (n+1), (n+2) of the image n. From the luminance values of the corresponding pixel point in the four frames of images, the smallest and the second smallest luminance values are selected. An average value of the smallest and the second smallest luminance values is calculated. The luminance value of the to-be-processed pixel P of the image n is replaced with the average value, to avoid the influence of the rain or snow to the luminance of the image. In another embodiment, the luminance value of the to-be-processed pixel P of the image n may be replaced with the smallest value of the luminance values of the corresponding pixel point in the four frames of images.

At the steps S2821 and S2823, luminance values of the corresponding pixel point in the former one, three or more frames and latter one, three or more frames of the image n may also be extracted.

At step S29, an image captured in frog is processed.

The frog image process step of the step S29 may be performed with homomorphic filtering, to eliminate influence of frog to the luminance of the image.

Specifically, an image f(x,y) is expressed in a form of a product of an illumination component and a reflection component:

$$f(x,y)=i(x,y)r(x,y)$$

Where $0 \leq i(x, y) \leq +\infty$ is the illumination component and $0 \leq r(x, y) \leq 1$ is the reflection component. A natural logarithm of each side of the formula is taken as:

$$\ln f(x,y) = \ln i(x,y) + \ln r(x,y)$$

Fourier transformation is performed to obtain:

$$F(u,v)=I(u,v)+R(u,v)$$

F (u,v) is processed with a homomorphic filter function H(u,v) as:

$$S(u,v)=H(u,v)F(u,v)=H(u,v)I(u,v)+H(u,v)R(u,v)$$

Where the configuration of the profile of H(u, v) may be approximate by a basic form of any ideal high pass filter, such as a slight modification of a Gaussian high pass filter:

$$H(u,v)=(\gamma_H-\gamma_L)[1-e^{-c(D^2(u,v)/D_0^2)}]+\gamma_L$$

Figure 6:
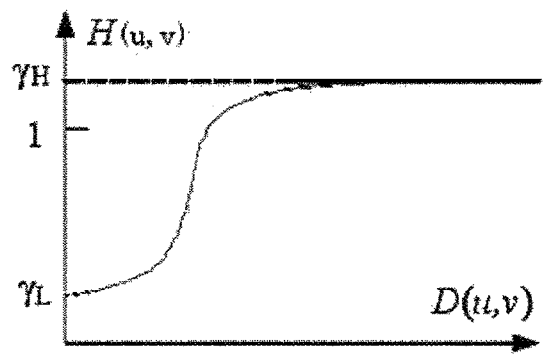
FIG. 6 shows an example of a graph of the homomorphic filter function.

FIG. 6 illustrates an exemplary diagram of a profile of a homomorphic filter function.

Fourier inverse transformation is performed to obtain:

$$s(x,y)=F^{-1}[H(u,v)I(u,v)]+F^{-1}[H(u,v)R(u,v)]$$

Finally, an exponent calculation is performed to obtain:

$$g(x,y)=\exp(s(x,y))$$

Where, g(x, y) is a result of the frog image process step.

Each frame of image is pre-processed at step S3, and become a frame of image with high quality. Then, each frame of image may be processed in subsequent steps.

Step S3 is performed after step S2. Step S3 is an aircraft capturing step.

In order to capture a docking aircraft for subsequent guiding operation, the images after pre-processing step S2 require further analysis, to accurately recognize whether an aircraft appears in these images.

Step S3 further includes: Step S31, a background elimination step; Step S32, a shade elimination step; Step S33, a region classifying step; and Step S34, a feature verification step.

Specifically, since the aircraft exists in the foreground of the images, in order to accurately capture the aircraft from the images, the background of the image should be eliminated firstly to erase noise in the images.

Figure 7A:
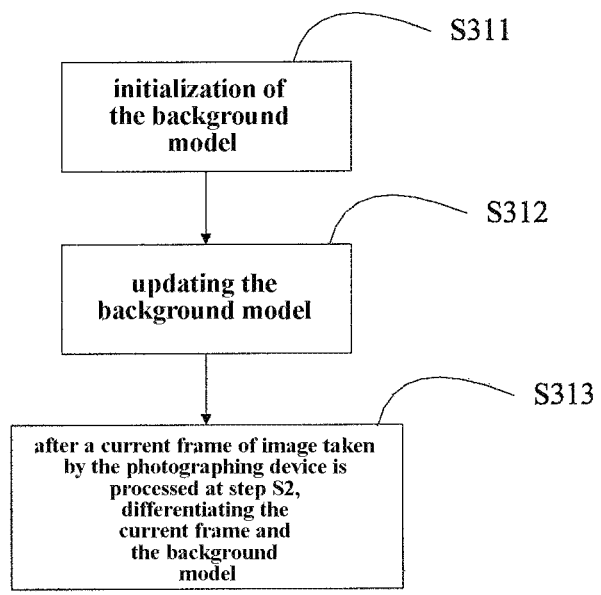
FIG. 7A shows a background canceling flow diagram of the present disclosure.

The background elimination step of step S31 is to use a single Gaussian background model to simulate the dynamic distribution of the background in the scene and to establish a background model, and then the current frame and the background model are differentiated to eliminate the background. The flowchart of the background elimination step is shown in FIG. 7A.

Step S31 further includes a step S311: initialization of the background model.

In the present disclosure, a single Gaussian background model is used. In the single Gaussian background model, each pixel in the background model is considered as in a one-dimensional normal distribution, and the pixels are independent from each other. The distribution may be determined by an average value and a variance of a noinial distribution.

Training of the background model is performed using successive N-frame images that have been processed at step S2, to determine the average value and variance of the Gaussian distribution. If in the captured N-frame images, an aircraft does not appear in the capturing region 6, the scene of the capturing region 6, i.e. the N-frame images are the background images. The N-frame images are captured at the same position. The N-frame images may be for example 50 frames of images captured by a photographing device 1.

For each pixel, an average gray value $\mu^0$ and a variance $\sigma_0^2$ of gray scale of the pixel in the continuous N frame images f (x, y) are calculated. An initial background image $B_0$ in a Gaussian distribution $\eta(x, \mu_0, \sigma_0)$ is formed by $\mu_0$ and $\sigma_0^2$, as $B_0=[\mu_0, \sigma_0^2]$.

Where:

$$\mu_0(x, y) = \frac{1}{N}\sum_{i=0}^{N-1} f_i(x, y),$$

$$\sigma_0^2(x, y) = \frac{1}{N}\sum_{i=0}^{N-1} [f_i(x, y) - \mu_0(x, y)]^2$$

In this way, a Gaussian model $\eta(x_i, \mu_i, \sigma_i)$ is established for each pixel in each image. Where, the subscript i refers to an order number of the frame of the image, $x_i$ is a current pixel value of the pixel point, $\mu_i$ is the average value of the Gaussian model of the current pixel point, and $\sigma_i$ is the mean squared error of the Gaussian model of the current pixel point.

Then, determination is made according to $\eta(x_i, \mu_i, \sigma_i)$. If $\eta(x_i, \mu_i, \sigma_i) \leq T_P$ (where, Tp is a probability threshold, or may be referred to a foreground detection threshold), the pixel point may be determined as a foreground pixel point, otherwise the pixel point may be determined as a background pixel point (at this time, $x_i$ matches with $\eta(x_i, \mu_i, \sigma_i)$). All collected background pixel points form a background model. Then, the initialization of the background model is completed.

In practical application, the probability threshold $T_P$ may be replaced with an equivalent threshold $d_i=|x_i-\mu_i|$. In conventional one dimensional situation, the foreground detection threshold may be set according to a value of $d_i/\sigma_i$. If $d_i/\sigma_i>T$ (the value of T is between 2 and 3), the pixel point may be determined as a foreground pixel point, otherwise may be determined as a background pixel point.

At step S312, the background model is updated.

If the scene changes after the step S311 is completed, the background model needs to respond to these changes, and the background model should be updated.

The background model is updated with real-time information from images continuously taken by the photographing device 1 after the change of the scene, as shown by the formula below:

$$\mu_i+1=(1-\alpha)\mu_i+\alpha x_i \sigma_{i+1}=\sqrt{(1-\alpha)\mu_i^2+\alpha d_i^2}$$

Where $\alpha$ is an updating rate and represents a speed of updating of the background model. If the pixel is a background pixel, the updating rate $\alpha$ may be 0.05. If the pixel is a foreground pixel, the updating rate $\alpha$ may generally be 0.0025.

If the scene does not change after the completion of step S311, the process goes directly to perform step S313.

At step S313, after a current frame of image taken by the photographing device 1 is processed at step S2, the current frame and the background model are differentiated to obtain a foreground region of the current frame of image.

At this step, after the differentiation step, the method also includes performing morphological corrosion and dilation operations on the obtained differentiation result, to obtain a more accurate boundary of the foreground region. This morphological corrosion and expansion operation is a step that is known to those skilled in the art in the prior art.

After eliminating the background in the image, the shadows in the image can be further eliminated for accurate capture of the aircraft.

In the shading elimination step at step S32, the gray values of the respective pixels in the foreground region obtained through the processing of step 31 are firstly computed to find the maximum gray value g max and the minimum gray value g min and the shading elimination is performed on the regions with lower gray values. The region of the lower gray level value is a region of a gray value less than g min+(g max_g min)*0.5.

Each frame of image includes a foreground region and a background region, and the foreground region and the background region may overlap with each other, the pixels in the foreground region may have corresponding background pixels at the same position in the background region.

The gray scale ratio between each pixel and the corresponding background pixel is obtained in the lower gray level region, and if the ratio is between 0.3 and 0.9, the pixel is regarded as a shadow point.

The non-shaded regions in the set of shadow points are then removed by multiple morphological etch and expansion operations, resulting in a shaded region.

The shadow region is removed from the foreground region, and the target region is obtained by eliminating the holes in the foreground region and connecting the regions by multiple morphological expansion and corrosion operations. The target region corresponds to the object appearing in the capturing region 6, possibly the aircraft, or other objects such as a vehicle.

In the region classification step of step S33, a template of a standard front view of an aircraft region is created in advance, and the template can be used for distinguishing an aircraft from a non-aircraft, since an aircraft has a feature of narrow at either side and wide in the middle.

The target region is extracted through change detection, and a vertical projection curve of the target region is calculated. Subsequently, a vertical projection curve of the standard front view of an aircraft region is obtained. It may be determined whether a correlation coefficient between the vertical projection curve of the target region and the vertical projection curve of the standard front view of the aircraft region is greater than a classification threshold. If so, it means that the target region corresponds to an aircraft and the process is turned to perform step S34. Otherwise, it means that the target region corresponds to an object other than an aircraft. The classification threshold is, for example, 0.9.

At step S33, whether or not the target region is an aircraft is substantially determined only based on the external outline. Further, it is further determined through a feature verification step of step S34 whether the target region is indeed an aircraft. The feature verification step is to further verify whether the target is an aircraft by detecting the engine and the front wheel of the captured aircraft.

At Step S34, the method may also include the following steps.

At step S341, a blackest image region is extracted.

A gray scale histogram of the target region of the current frame of image is made. The maximum (gmax) gray value and the minimum value (gmin) are acquired in a gray level range of 1% to 99% (generally gray scales of 2 to 253), to obtain a ratio of the maximum (gmax) gray value/the minimum (gmin) gray value, which is not equal to 0. It may be determined whether it is day or night based on the ratio. A preset threshold for extracting the darkest region may be selected according to the ratio, to obtain the darkest region.

Specifically, a threshold BlackestJudge is used to extract a region in the image in which the gray value is between gmin and (gmax-gmin)*BlackestJudge+gmin, that is, the darkest part of the image, to obtain the darkest region.

It may be determined whether it is day or night according to the ratio of the maximum (gmax) gray value/the minimum (gmin) gray value. When the ration is larger than a standard value, it is day and the threshold BlackestJudge may be selected as 0.05, for example. Otherwise, it is night, and the threshold BlackestJudge may be selected as 0.5, for example.

Figure 7B:
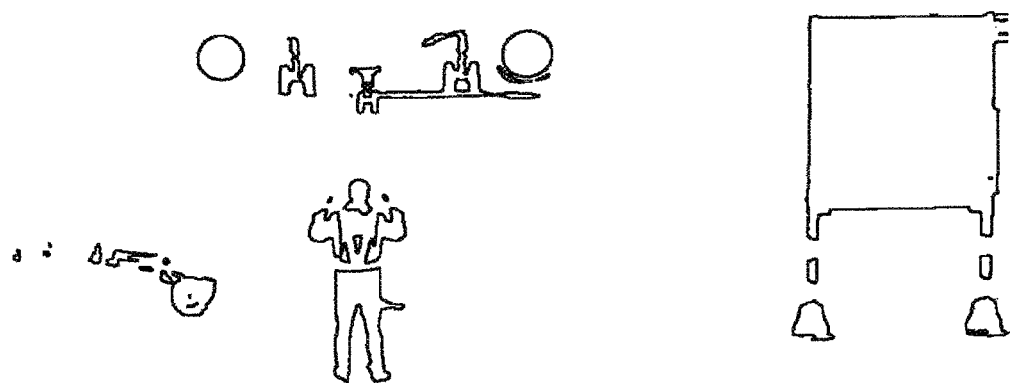
FIG. 7B shows a typical blackest region schematic.

A typical blackest region may be shown as in FIG. 7B, where each of the graphs is a darkest region.

Step S342: Circular-like detection.

All of the outer boundaries of the blackest region are extracted, and for each boundary, a gravity center coordinate is calculated.

Specifically, the gravity center coordinate may be calculated using moments of the boundary. A $ji^{th}$-order of moment $m_{ji}$ of the boundary may be defined as follows:

$$m_{ji} = \sum_{x,y} (f(x, y)x^j y^i)$$

(x, y) is the coordinate value of the pixel, and f (x, y) is the image of the blackest region.

The gravity center coordinate can be calculated from 00,10,01 orders of moments:

$$\bar{x} = \frac{m_{10}}{m_{00}}, \bar{y} = \frac{m_{01}}{m_{00}}$$

For all pixel points of the current boundary, a distance from each pixel to the gravity center is calculated. If a ratio of the maximum value of the calculated distances and the minimum value of the calculated distances exceeds a preset value (preferably the threshold for determining a circle circleJudge may be 1.5), it may be determined that the boundary does not correspond to a circular region. Otherwise, if the ratio of the maximum value of the calculated distances and the minimum value of the calculated distances does not exceed the preset value, it may be determined that the boundary corresponds to a circular region. Determination on all of the boundaries may be made according to this rule.

If it is determined that it is a circular region (briefly like-circular region), the gravity center coordinate and an average distance from the boundary to the gravity center (i.e. radius) may be recorded. Then, the process is turned to a similarity determination step S343.

Figure 7C:
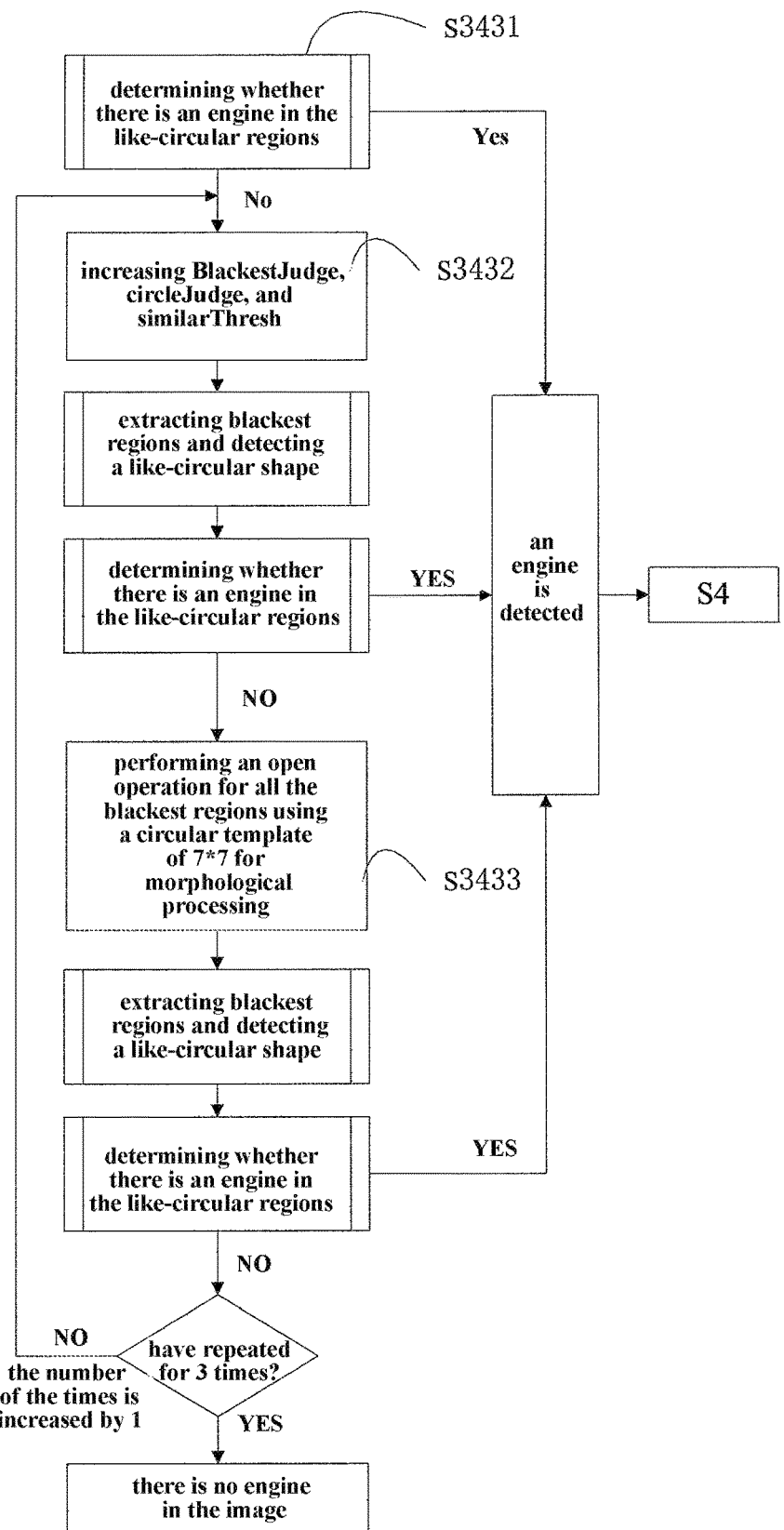
FIG. 7C shows a flow diagram of similarity determination.

Step S343 is a similarity determination step. FIG. 7C shows a flow chart of the similarity determination step.

Step S343 may also include the following steps.

At step S3431, it may be determined whether there is an engine in the like-circular regions by calculating the similarity of the like-circular regions. If so, step S4 is performed. Otherwise, step S3432 is performed.

Assuming that totally M like-circular regions are detected, in which a similarity degree between an $i^{th}$ like-circular region and an $j^{th}$ like-circular region may be calculated as:

$$Similarity_{ij}=|Height_i-Height_k|*|Radius_i-Radius_j|$$

Where Height is a height of the gravity center, and Radius is an average distance from the boundary to the gravity center (i.e. radius).

When the similarity degree $Similarity_{ij}$ is less than a similarity threshold similarThresh (preferably preset as 40), then the circle-like regions i and j are considered to be engine regions. If none of the similarity degrees $Similarity_{ij}$ is less than the threshold value similarThresh, it may be considered that the engine region is not detected, and step S3432 is performed.

At step S3432, the threshold value is adjusted, and steps S341, 342, and 3431 may be performed again. If the engine region is not detected, step S3433 is performed.

The thresholds BlackestJudge, circleJudge, and similarThresh are respectively increased, and the increased amounts are preferably set to 0.05, 0.5, and 20, respectively, and the steps of extracting the blackest regions, circle-like regions detection and engine detection are performed. If the engine region is still not detected, step S3433 is performed.

At step S3433, an open operation is performed for all the blackest regions using a circular template for morphological processing, and steps S342 and 3431 are repeated.

The circular template may preferably be a circular template of 7*7. After the opening operation, the circle-like detection step S342 and the engine detection step S3431 are perfoumed. If the engine region is not detected, step S3432 is iterated.

If the engine region is not detected after N times of iteration, it may be determined that there is no engine in the image. N may preferably be twice.

When detecting subsequent frames of images, if the number of iterations used in the previous frame is n, it is iterated directly from step n−1.

At step S344, the front wheel is detected.

A rectangle region lower than a connecting line of the centers of the circles of engines detected at step S343 for 4 times and a half of the height of the engine, is considered as a search region.

Figure 7D:
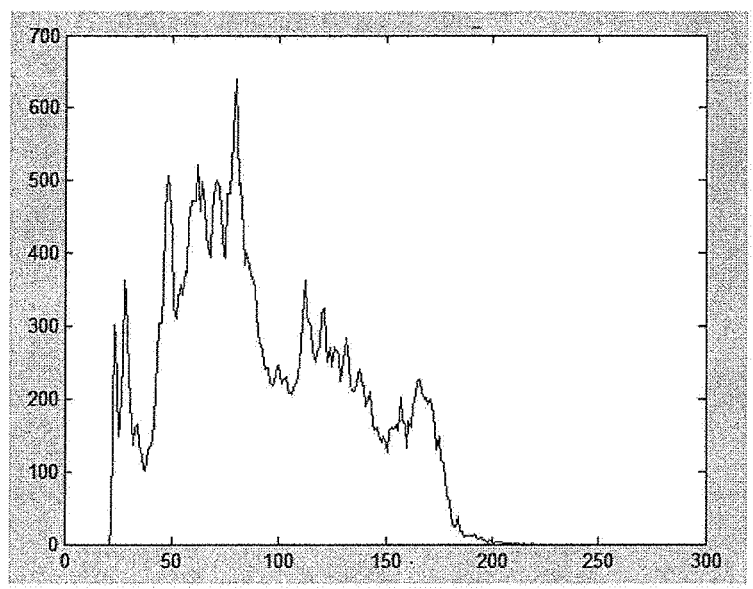
FIG. 7D shows an example of a grayscale histogram of 256 levels of grayscale.

In the search region, 256 levels of grayscale are quantized to 64 levels. An example of a grayscale histogram of 256 levels of grayscale is shown in FIG. 7D. A grayscale histogram of 64 levels of grayscale after the quantization is shown in FIG. 7E.

Figure 7E:
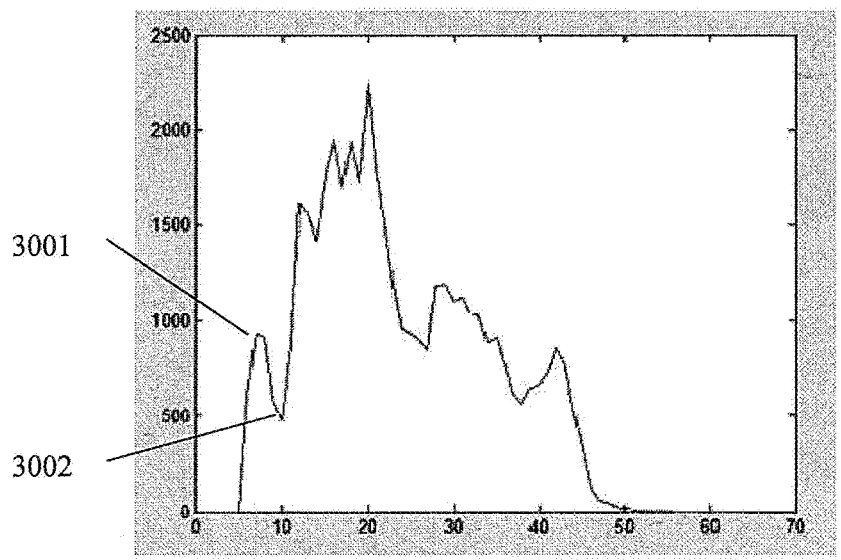
FIG. 7E shows an example of a grayscale histogram of 64 levels of grayscale after quantization.

For example, in FIG. 7E, a first peak 3001 and a first valley 3002 are searched out in the histogram of the 64 levels of grayscale after the quantization.

Assuming that after the quantization the first peak position is represented as peak and the first valley position is represented as valley, the optimal peak position BestPeak and the optimal valley position BestValley in the original histogram of the 256 levels of grayscale may be defined as:

$$BestPeak = \underset{peak*4-4\leq i\leq peak*4+3}{\operatorname{argmax}} \{hist_{256}(i)\}$$

$$BestValley = \underset{BestPeak<i\leq valley*4+3}{\operatorname{argmin}} \{hist_{256}(i)\}$$

Where $hist_{256}(i)$ represents a total number of pixels with a grayscale i in the histogram of the 256 levels of grayscale.

Figure 7F:
FIG. 7F shows an example of the effect of closing an image using a flat elliptical structure element.

The grayscales are partitioned according to the optimal valley BestValley. For portions smaller than the optimal valleys BestValley, trivial points with small areas are removed, a closing operation is performed on the image with a flat elliptical structure element. The effect may be shown in FIG. 7F.

Then, $7^{th}$-order Hu moments of the boundary are calculated for all the graphs after the closing operation and compared with Hu moments of a preset standard front wheel model. The Hu moment feature is a geometrical moment proposed by Hu (Visual pattern recognition by moment invariants) in 1962. The Hu moment feature has characteristics of translation, rotation and scale invariance. The Hu moment feature utilizes 7 invariant moments constituted with second order and third order central moments. Therefore, in a $7^{th}$-order Hu moment feature, $7^{th}$-order is the uniquely determined. When the similarity degree is lower than a threshold value (preferably 1), it may be determined as a wheel. In this way, the location of multiple sets of wheels are obtained, in which a wheel in the lower middle is a front wheel.

Once it is determined that the engine and the front wheel are detected, it may be considered that the acquisition is successfully completed, and step S4 is performed.

Step S4, aircraft tracking step.

At this step, the position and radius of the engine are extracted according to the great difference in brightness between the outer wall and the inner part of the engine and the circular structure of the engine, so as to realize the real-time positioning of the aircraft and accurately obtain the deviation degree of the aircraft with respect to the guide line. Then, the front wheel of the aircraft may be found according to the spatial relationship, and the aircraft may be positioned.

Specifically, after the aircraft is captured, the photographing device 1 continues to take images. After the aircraft is captured in the previous frame of image, for the current frame of image, the image pre-processing step S2 is performed, and then directly proceeds to step S4. Alternatively, step S4 is performed after S2 and S3.

Since the position of the engine has been acquired in the previous frame of image using the feature verification method at step S34, the position of the engine in the current frame of image will only be slightly shifted. Therefore, there is no need to detect the engine in the entire map again, and the engine may be extracted from a smaller extended region in the current frame of image. The parameters (BlackestJudge, circleJudge) of the previous frame may be used for detecting the target in the current frame.

Figure 8A:
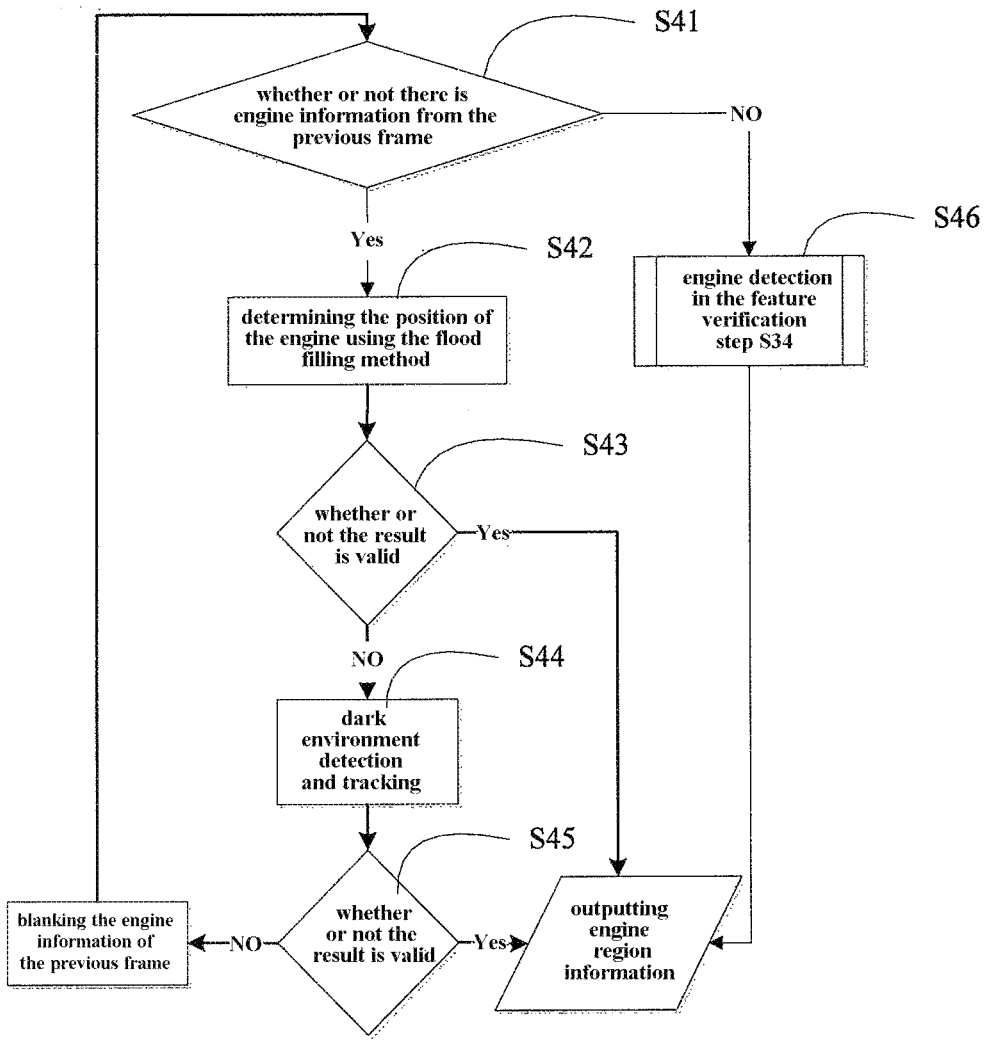
FIG. 8A shows a flow diagram of an aircraft tracking step.

The flow chart of the aircraft tracking step is shown in FIG. 8A.

At step S41, it is determined whether or not there is engine information from the previous frame. If so, step S42 is perfoimed. Otherwise, step S46 is performed.

At step S42, the position of the engine is determined using the flood filling method.

Figure 8B:
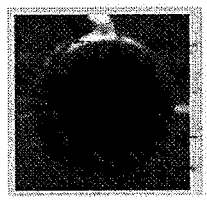
FIG. 8B shows an example of an image of an aircraft engine section.

Since the engine has a light-colored outer wall, the gray value thereof will be significantly higher than the black region inside the engine. A partial image of the aircraft engine is shown in FIG. 8B. Therefore, the center of the engine in the previous frame may be taken as a seed, to obtain the black region of the entire engine using the flood filling method.

When the sky is dark or has a low illumination, the gray value of the engine boundary may not be much higher than the center. Additionally with some noise points, overflow may occur using the flood filling method, resulting in invalid filling, so that the resulted engine region is significantly too large, and is not circular any longer. In this case, the process proceeds to step S43.

At step S43, it is determined whether or not the filling result at step S42 is valid. If so, step S46 is performed, otherwise, step S44 is performed.

Step S44, a dark environment detection and tracking step.

At this step, the parameters used in processing the previous frame of image may be readily used, and steps S341 and S342 are performed again to detect the engine region.

At step S45, it is determined whether or not the detection result is valid. If so, the information of the engine region is output. Otherwise, the engine information of the previous frame is blanked, and step S41 is performed.

At step S46, the feature verification step S34 is directly performed and the information of the engine region is output.

Step S46 cannot be performed for more than twice for a series of images in one aircraft docking. In addition, after a particular number of frames (e.g., 20 frames) of images are detected with the dark environment detection and tracking step S44, regardless of the detection result, the feature verification step S34 is performed.

Step S47, a front wheel tracking step.

After the information of the engine region is acquired, at this step, the front wheel of the aircraft is detected using the front wheel detection method at step S344, for the subsequent aircraft positioning step.

At step S48, a front wheel tracking emergency processing step.

When the detection result obtained at step S47 is obviously incorrect, that is, when it is determined that the region of the wheel has an incorrect shape and the position deviates significantly from the previous 5 to 10 frames, from the information on the previous frame and the current frame, the shift of the front wheel of the frame may be estimated using a shift of an engine in adjacent two frames. The estimated result is returned as a front wheel tracking result. If front wheel tracking results of more than N (N may be 20-30 frames) frames are significantly different from aircraft forward parameters, an error message may be outputted.

Step S5, an aircraft positioning step. This step is used to generate correct docking guidance information.

Step S5 further includes the following steps.

Step S51, a photographing device calibration and image correction step.

Step S52, an aircraft front wheel deviation degree calculating step.

Step S53, an aircraft front wheel actual distance calculating step.

The photographing device calibration process in the step S51 is to determine geometrical and optical parameters of the photographing device 1 and the orientation of the photographing device 1 with respect to the world coordinate system.

Photographing device calibration may be performed based on OpenCV. The calibration process uses a black and white planer checkerboard as a calibration template. For the photographing device 1, a plurality of pictures of the planer calibration template are captured from different angles to realize calibration of the photographing device 1. In order to make the calibration results more accurate, the calibration process requires images of at least 10 pieces of 7*8 checkerboards or larger. The calibration pictures should be captured as many as possible from different angles. The implementation process may be as follows:

At step S511, a number N of calibration pictures are read.

At step S512, a corner of the chessboard is found by using a function cvFindChessboardCorners 0 of OpenCV. The N calibration pictures read are respectively substituted to the function cvFindChessboardCorners ( ). If all the corners are successfully found, the function returns 1, and coordinates of the corners in the image coordinate system are acquired. If it is not successful, the function returns 0.

At step S513, if the corners are successfully searched out, the coordinates of the corners in the calibration template are substituted into the function cvCalibrateCamera2 ( ). The function returns a parameter matrix, a distortion coefficient, a rotation vector and a translation vector of the photographing device 1.

Since in practice, a lens has different degrees of distortion, mainly a radial distortion and a slight tangential distortion, the radial distortion coefficient and the tangential distortion coefficient is contained in the distortion coefficient returned by the function cvCalibrateCamera2 ( ). Therefore, the parameters are substituted into a function cvUndistort2 ( ) of OpenCV, to remove the lens distortion in mathematics.

The aircraft front wheel deviation degree calculation step S52 is to determine whether the front wheel of the aircraft is on the guide line, or left or right with respect to the guide line.

The coordinates of the position of the front wheel may be obtained from the result of the front wheel tracking step S47. Then, relevant position information of the guide line, the stop line and the like may be obtained from the scenario definition. Based on the algebra knowledge of relationship between a midpoint and a straight line, the degree of deviation of the front wheel of the aircraft may be determined. The process may specifically include the following.

The coordinates $(x_0, y_0)$ of the position of the front wheel may be obtained from the front wheel tracking result. From the definition of the scenario, coordinates $(x_{G1}, y_{G1})$ and $(x_{G2}, y_{G2})$ of any two points on the guide line and coordinates $(x_{S1}, y_{S1})$ and $(x_{S2}, y_{S2})$ of any two points on the stop line may be obtained. If coordinates on the x axis of the two points on the guide line satisfy: $x_{G1}=x_{G2}$, a linear equation 1 of the guide line 41 may not be represented in a point slope form. In this case, the linear equation 1 is: $x_1=x_{G1}$. The slope of the line is $k_1 \to \infty$. When $x_{G1} \neq x_{G2}$, the linear equation 1 is: $y_1=k_1x_1+b_1$. Similarly, the linear equation 2 of the stop line 42 is $y_2=k_2x_2+b_2$. The coordinate system is established on the image, and seen from the installation position of the photographing device 1, the x axis is from left to right and the y axis is from bottom to top, the distance from the point of the coordinate to the line with the point modified is:

$$d = \frac{kx - y + b}{\sqrt{k^2 + 1}}$$

Unlike a common distance equation, the results obtained by this equation can be either positive or negative. The current coordinates $(x_0, y_0)$ of the front wheel of the aircraft are substituted into the two linear equations, then $d_1$ and $d_2$ are obtained as:

$$d_1 = \begin{cases} x_0 - x_{G1}, \text{ when the linear formula 1 is } x_1 = x_{G1} \\ \dfrac{k_1 x_0 - y_0 + b_1}{\sqrt{k_1^2 + 1}}, \text{ when the linear formula 1 is } y_1 = k_1 x_1 + b_1 \end{cases}$$

$$d_2 \dfrac{k_2 x_0 - y_0 + b_2}{\sqrt{k_2^2 + 1}}$$

$d_2 \geq 0$ means that the front wheel of the aircraft exceeds the stop line 41. $d_2 < 0$ means that the front wheel of the aircraft dose not reach the stop line 41. At this time, if $k_1 > 0$ (including $k_1 \rightarrow +\infty$), $d_1 > 0$ means that the aircraft is deviated to left, and $d_1 < 0$ means that the aircraft is deviated to right. If $k_1 > 0$, $d_1 < 0$ means that the aircraft is deviated to left, and $d_1 > 0$ means that the aircraft is deviated to right. Deviation to left or to right is determined from a perspective of the pilot of the aircraft. Further, in order to avoid the algorithm being too sensitive and leading to a conclusion "deviation from the guide line" whenever $d_1 \neq 0$, a determination condition $|d_1| > \text{width}/2$ may be added. Where width represents a threshold, and the threshold may equal to a width of the front wheel of the aircraft. When the determination condition is satisfied, it may be considered that the aircraft has deviated from the guide line.

The deviation is determined from the parameters as shown in Table 1.

| | Determination Condition | | Deviation |
|---|---|---|---|
| $d_2 \geq 0$ | | | exceeding stop line |
| $d_2 < 0$ | $k_1 > 0$ (including $k_1 \rightarrow +\infty$) | $d_1 < 0$ and $|d_1| > \text{width}/2$ | to right |
| | | $|d_1| \leq \text{width}/2$ | no deviation |
| | | $d_1 > 0$ and $|d_1| > \text{width}/2$ | to left |
| | $k_1 < 0$ $k_1$ has a limited value | $d_1 < 0$ and $|d_1| > \text{width}/2$ | to left |
| | | $|d_1| \leq \text{width}/2$ | no deviation |
| | | $d_1 > 0$ and $|d_1| > \text{width}/2$ | to right |

The aircraft front wheel actual distance calculating step S53 is for real-time calculating the true distance of the aircraft from the stop line.

First, the correspondence between image coordinates and geodetic coordinates is established. The black and white scale is placed next to the guide line in the scene. Then, in the scene definition, according to the scale, the mark points are drawn every 1 m at the maximum interval, and the distance of each mark point from the first mark point in the actual scene is recorded.

The coordinates of the mark points set in the scene at S1 are image coordinates, for example, 20 points in a 1-meter interval, respectively {point 1, point 2, . . . , point 20}. A relative coordinate of each point from the endpoint point 1 on the stop line is calculated as {relativepoint 1, relativepoint 2, . . . , relativepoint 20} where a coordinate of relativepoint1 is (0,0), a distance of each point from the end point relativepoint1 is {dis1, dis2, . . . , dis20}, and an actual distance of each point from the end point relativepoint1 is respectively {0 m, 1 m, . . . , 19 m}. Then, one-to-one corresponding relationship between {dis1,dis2, . . . , dis20} and {0 m, 1 m, . . . , 19 m} may be determined.

Figure 9:
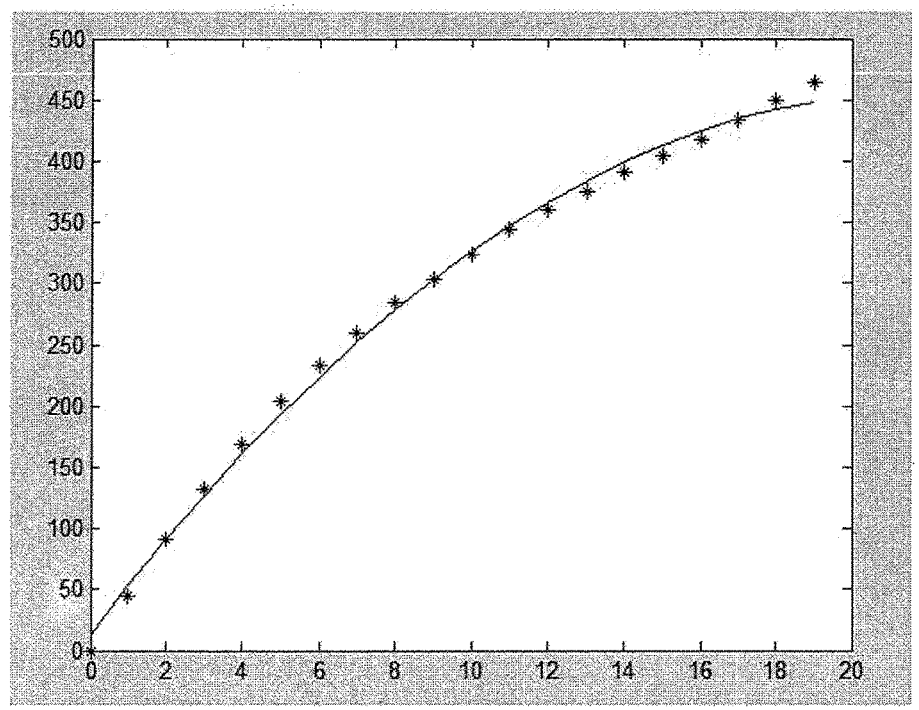
FIG. 9 is an example of the correspondence between the actual distance and the image distance and the fitting curve.

Points on the ground at equal intervals in the image present as a quadratic curve in the image. That is, with the increase of distance, the intervals between two points form arithmetical progression. Therefore, quadratic curve fitting may be performed on the points with the least squares method, to obtain a curve equation $y = ax^2 + bx + c$, where x is a distance in the image, y is the actual distance. FIG. 9 is an example of the correspondence between the actual distance and the image distance and the fitting curve. In FIG. 9, the horizontal axis represents the actual distance with a unit of m, and the vertical axis is a distance on the image with a unit of a pixel.

The front wheel of the aircraft on the image is projected on the guide line along a direction of the stop line. An Euclidean distance from the projection point to the stop line is denoted by x. By substituting x into an equation $y = ax^2 + bx + c$ the value of y, i.e. the actual distance (the unit is m) from the front wheel of the aircraft to the stop line may be obtained. In this way, accurate docking guide information may be generated.

Before the plane enters the station floor, the airport transmits the model information to the machine-vision-based aircraft docking guide and the type recognition system. After step S3 is completed, the step S6 is performed next, the aircraft identification and identity verification step is to verify the model information through image analysis. That is, steps S4, S5 may be performed in synchronization with step S6.

Figure 10A:
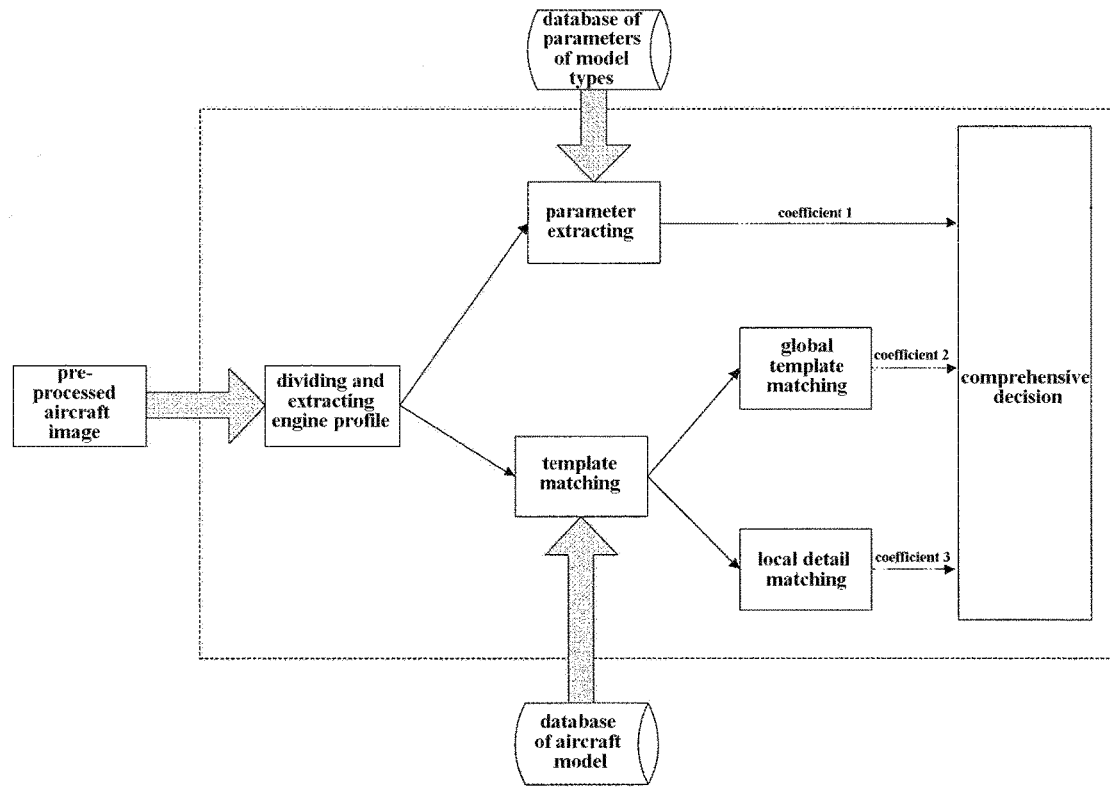
FIG. 10A shows a flow chart of the aircraft identification and verification algorithm.
Figure 10B:
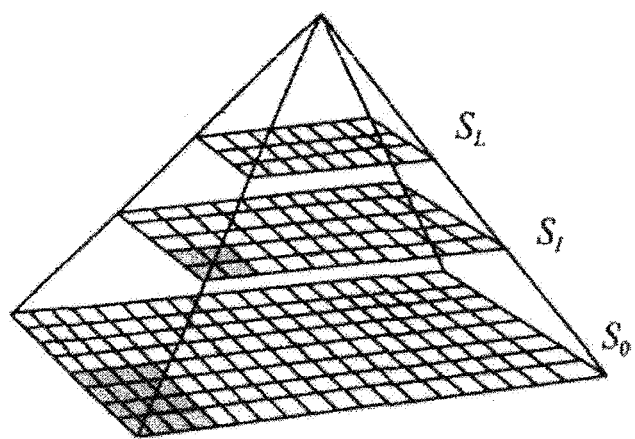
FIG. 10B shows a hierarchical image structure diagram.

FIG. 10A illustrates a flow chart of an aircraft identification and verification algorithm. FIG. 10B is a schematic diagram of a hierarchical image structure. It is preferable to use a method for detecting coarse-to-fine multi levels of visual features to detect a profile of an aircraft. The method includes the following steps.

When i=0, the original image S0 may have the highest resolution. The resolution of the image decreases with the increase of i. When i=L, the image SL may have the lowest resolution. FIG. 10B is a schematic diagram of a hierarchical image structure. Under the environment with a high noise (such as under weather of rain, snow, fog or at night, etc.), a hierarchical image with relatively low resolution may be used. While in sunny weather conditions, using a hierarchical image with higher resolution may result in a higher accuracy. By acquiring the aircraft region in the low-resolution image and mapping the acquired aircraft region to the original image S0, a region divisional result with an mosaic edge effect may be obtained.

The coarse-to-fine multi-level visual feature detection method is used for bad weather, such as rain, snow, fog, and night when the noise of the image is large, so that decrease of the resolution can improve the detection effect. The resolution may be increased to the maximum resolution through subsequent mapping, for identification and validation of the model type of the aircraft. This is a method for detecting features of an aircraft under bad weather. The system may automatically determine an optimal resolution according to the quality of the image, in order to extract the profile of the aircraft.

Step S6 specifically includes the following steps.
Step S61, parameter verification.
Step S62, template matching.
Step S63, comprehensive judgment.
Step S61 further includes the following steps.
At step S611, parameters of the aircraft engine are extracted and compared with parameters of the aircraft engine of a corresponding model type preset in a database of the system.

The step of extracting the parameters of the aircraft engine may be implemented through the above described steps S341-S343. The extracted parameters of the aircraft engine can be counted in pixels.

The ratio (referred to as a first ratio) of the radii of the engine in the extracted parameters of the aircraft against a radii of an engine corresponding to the model information received by the system in a model parameter database in the airport is calculated.

At step S612, the aircraft wing parameters are extracted and compared to the aircraft wing parameters of the corresponding model preset in the database.

Figure 10C:
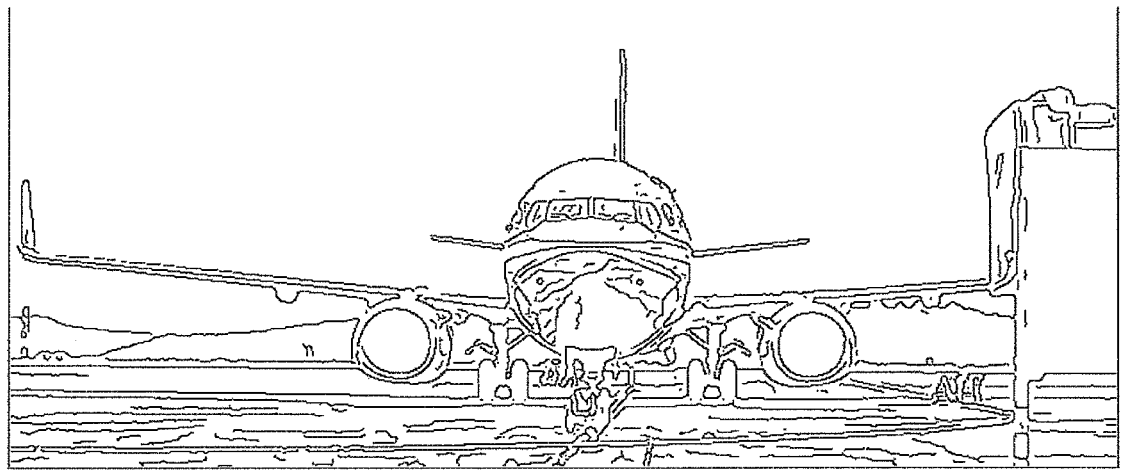
FIG. 10C shows an example of an aircraft image edge.

The step of extracting the aircraft wing parameters includes:

At step S6121, an edge of the aircraft image is extracted using a Canny operator. An example of an aircraft image edge is shown in FIG. 10C.

At step S6122, an aircraft image edge pixel is extracted and the pixel points are enumerated axially in an aircraft engine away from the boarding bridge side (a left side in FIG. 10C) of the aircraft, and for each pixel, a plurality of straight lines having an inclination angle of 0-20 degrees are drawn, the number of Canny edge pixels passed by each of said straight lines is counted;

At step S6123, the edge of the aircraft wing is determined, and two lines passing through the largest number of edge pixels are taken as the edge of the aircraft wing.

At step S6124, the tip of the aircraft wing is determined and the edge pixels of the region around the wing tip are taken as the wing tip feature.

Figure 10D:
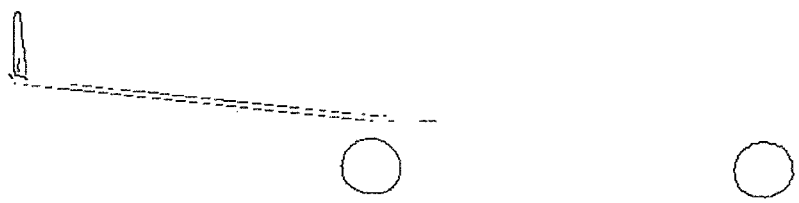
FIG. 10D shows an example of a wing profile and an engine profile.

An example of a wing profile and an engine profile is shown in FIG. 10D.

At step S6125, parameter comparison is performed. The length of the wing of the aircraft is measured by the position of the wing tip, and the ratio (referred to as a second ratio) of the length of the wing of the aircraft to the wing length data corresponding to the received model information in the airport model parameter database is calculated.

At step S613, characteristics parameters of the aircraft head are extracted and compared with parameters of aircraft head characteristic corresponding to the model preset in the database.

Step S6131, the boundary of the aircraft head is determined. The center position of the aircraft is determined by the determined aircraft engine parameters. The points on the central axis are enumerated as the center of the circle. A radius that is 2 to 4 times of the radius length of the aircraft engine is enumerated to draw a circle. The circle passing through the largest number of Canny edge pixels is taken as the boundary of the aircraft head.

At step S6132, the aircraft head window is determined. Since the window is in the upper semicircle of the aircraft head, the depth priority search is used to find the longest edge of the upper semicircle of the boundary of the aircraft head which is not adhered to the edge of the aircraft head, to serve as the position of the aircraft head window.

Step S6133, parameters are compared, aircraft head radius is measured, and the radio (referred to as a third ratio) of the radius of the aircraft head to the radius of the aircraft head corresponding to the received model information in the airport model parameter database is calculated. The measured radius of the aircraft head can be in pixels.

At step S614, the aircraft tail parameters are extracted and compared with the aircraft tail parameters preset to the corresponding model in the database.

At step S6141, a portion of the protrusion is found along the upper edge of the boundary of the aircraft head by the method of depth-first search.

Step S6142, the parameters are compared and the height of the aircraft tail is measured in the unit of pixel. The ratio of the aircraft tail height to the aircraft tail parameter corresponding to the model information received in the airport model parameter database is calculated. This ratio is called the fourth ratio.

At step S615, a minimum value and a maximum value among the first ratio, the second ratio, the third ratio, and the fourth ratio are taken, and the ratio of the minimum value/ the maximum value is taken as the model similarity parameter as the coefficient 1.

The template matching step S62 includes:

At step S621, the global template matching is performed, and the global template similarity parameter is calculated as the coefficient 2 by taking the whole image currently captured as the searched image and the standard aircraft image in the system database as the template.

Figure 10E:
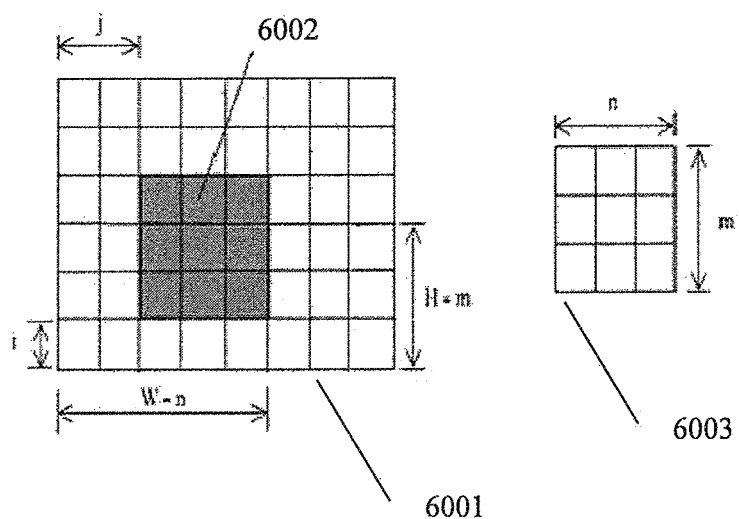
FIG. 10E shows a schematic view of the searched image S, sub-image S and template T.

FIG. 10E is a schematic view of the searched image S, the subgraph $S^{ij}$, and the template T. Specifically, the global template matching calculation process is: the searched image S, the mark 6001 in the figure, and the width and height W*H. The subgraph $S^{ij}$ of the searched image S, the mark 6002 in the figure, the width and height n*m, j pixels away from the left edge, and i pixels away from the lower edge. A template T, denoted as 6003 in the figure, has wide and height of n*m. The similarity parameter R (i, j) between the template T and subgraph $S^{ij}$ is:

$$R(i, j) = \frac{\sum_{m=1}^{M}\sum_{n=1}^{N} S^{ij}(m, n) \times T(m, n)}{\sqrt{\sum_{m=1}^{M}\sum_{n=1}^{N} [S^{ij}(m, n)]^2} \sqrt{\sum_{m=1}^{M}\sum_{n=1}^{N} [T(m, n)]^2}}$$

M is the maximum value that the subgraph $S^{ij}$ can be obtained in the height direction, and N is the maximum value that the subgraph $S^{ij}$ can obtain in the width direction.

The maximum value Rmax (im, jm) of R (i, j) is found in all the results R (i, j), the corresponding subgraph $S^{ij}$ is the matching target, Rmax ($i_m$, $j_m$) is the global template similarity parameter of the subgraph $S^{ij}$.

At step S622, the local template matching is performed, respectively, with the aircraft engine, the aircraft wings, the aircraft head, and the aircraft tail position extracted at step S61 as the searched image, respectively, with the engine, the wing, the head and the tail of the standard aircraft image corresponding to the received model infoimation in the airport model parameter database as templates, using the calculation formula at step S621, 4 similarity parameters R of the aircraft engine, the aircraft wings, the aircraft head, and the aircraft tail are respectively calculated, a minimum value of the 4 similarity parameters is removed, and an average of the remaining 3 similarity parameters of the 4 similarity parameters is taken as a local template similarity parameter. The local template similarity parameter is used as the coefficient 3.

At step S63, it is judged synthetically that at least two of the coefficients 1, 2, 3 are equal to or greater than a first verification threshold, or when all of the coefficients 1, 2, 3 are greater than a second verification threshold, the currently captured aircraft is matched with the model information obtained in advance, the identity verification is passed, otherwise, the verification fails.

A step S7, an information display step.

The display device 3 is a large-sized display installed at an airport for viewing by an aircraft pilot during an aircraft docking process, and also for an airport operator to observe the aircraft.

Figure 11:
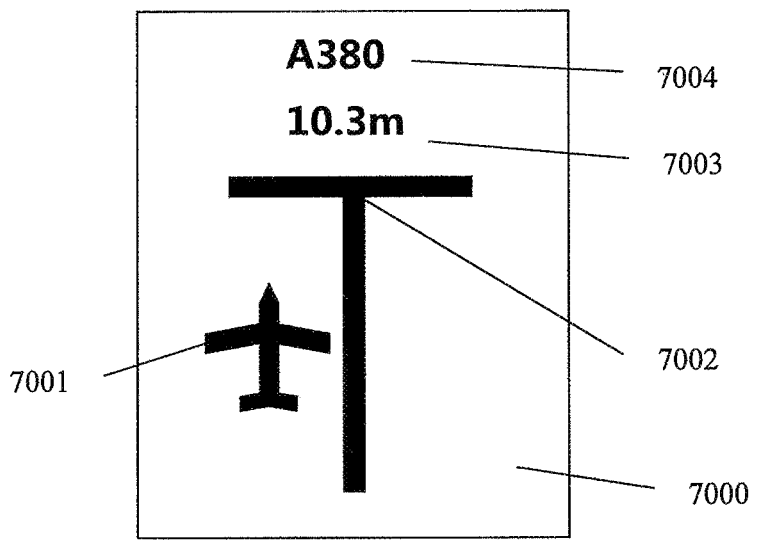
FIG. 11 is a diagram showing an example of a possible display mode displayed on the display device.

FIG. 11 is a diagram showing an example of a possible display mode displayed on the display device 3.

In the drawing, 7000 denotes a region for displaying guidance information on the display device 3, and 7002 denotes a "T" shape formed by a guide line and a stop line to facilitate showing the relative positions of the aircraft and the guide line and the stop line.

The berth guidance information, such as the specific position of the aircraft determined by the aircraft positioning step S5, including deviation to left or right 7001 and the distance away from the stop line 7003, are displayed on the display device in real time.

The aircraft type information 7004 verified by the aircraft identification and identity verification step S6 is also displayed on the display device in real time, for pilots to observe the aircraft's route, which improves the safety of aircraft docking.

In summary, the present disclosure realizes the capture, tracking, positioning and identity verification of the aircraft accurately during the docking process of the aircraft, and displays the accurate and effective guidance information of the aircraft berth on the display device 3, so as to provide the aircraft pilot, the co-pilot or other personnel with correct and effective berth guidance, so that the aircraft may achieve safe and effective berth, improving airport efficiency and ensuring safety.

Of course, the present disclosure may also have other various embodiments. Without departing from the spirit and essential of the present disclosure, those skilled in the art may make various corresponding variations and modifications according to the present disclosure. These corresponding variations and modifications are intended to be within the protection scope of the claims appended hereto.

What is claimed is:

1. A method for guiding an aircraft docking and recognizing an aircraft model based on machine vision, characterized in that the method comprises:
   a step for configuring an aircraft berthing scene, in which a monitored scene is divided into regions for separate data processing;
   an image pre-processing step, in which a captured image is pre-processed;
   an aircraft capturing step, in which it is determined that an aircraft exists in the image by recognizing an engine and front wheels of the aircraft in the image;
   an aircraft tracking step, in which the image of the engine and the front wheels of the aircraft recognized in the aircraft capturing step is continuously tracked and updated in real time;
   an aircraft positioning step, in which the aircraft is positioned in real time, and a deviation degree of the aircraft from a guide line and a distance between the aircraft and a stop line are accurately determined; and
   an information displaying step, in which the deviation degree of the aircraft from the guide line and the distance between the aircraft and the stop line determined in the aircraft positioning step are outputted and displayed, wherein the aircraft capturing step further comprises:

a background elimination step, in which a dynamic distribution of a background in the scene is simulated with a single Gaussian background model, a model of the background is established and the present image and the background model are differentiated to eliminate the background to obtain a foreground region;
   a shade elimination step, gray values of respective pixels in the foreground region are computed to find the maximum gray value g max and the minimum gray value g min thereof, and shading elimination is performed on the regions with gray values lower than T=g min+(g max−g min)*0.5;
   a region classification step, in which a template of a standard front view of an aircraft region is created, a target region is extracted through change detection, and a vertical projection curve of the target region is calculated, a correlation coefficient between the vertical projection curve of the target region and a vertical projection curve of the template of the standard front view of the aircraft region is calculated, if the correlation coefficient is larger than or equals to a classification threshold, the target region is determined as an aircraft; and
   a feature verification step, in which it is further determined whether the target region is an aircraft by detecting the recognized engine and front wheel of the aircraft.

2. The method of claim 1, characterized in that the image pre-processing step further comprises:
   determining whether the image is an image of low illumination, high illumination or normal illumination according to an average of gray scales of the image, performing a step for processing a low-illumination image on the image if the image is an image of low illumination, and performing a step for processing a high-illumination image on the image if the image is an image of high illumination;
   if the image is an image of normal illumination, determining whether the image is a normal image according to a variance of the gray scales of the image; and
   if the image is not a normal image, determining whether the image is an image captured in rain or snow or an image captured in fog, performing a step for processing a rain-or-snow image on the image if the image is an image captured in rain or snow, and performing a step for processing a fog image on the image if the image is an image captured in fog.

3. The method of claim 2, characterized in that the step for processing a low-illumination image comprises processing the image with the following formula:

$$g(x,y)=f(x,y)+af(x,y)(255-f(x,y))$$

where f(x, y) represents the image before the step for processing a low-illumination image, (x, y) represents coordinates of a pixel in the image, g(x, y) represents the image after the step for processing a low-illumination image, and a represents a parameter for processing a low-illumination image.

4. The method of claim 2, characterized in that the step for processing a rain-or-snow image comprises:
   searching in the image for a pixel to be processed which is contaminated by rain or snow by using a photometric model;
   for a pixel to be processed in the present image, extracting luminance values of corresponding pixels in a previous image and in a subsequent image of the present image, determining whether the corresponding pixels in the previous image and in the subsequent image of the present image are pixels to be processed according to the extracted luminance values, if the corresponding pixels are pixels to be processed, calculating an average value of the luminance values of the corresponding pixels and replacing a luminance value of the pixel to be processed in the present image with the average value, and if the corresponding pixels are not pixels to be processed, replacing a luminance value of the pixel to be processed in the present image with a minimum value of the luminance values of the corresponding pixels or an average value of two smallest luminance values of the corresponding pixels.

5. The method of claim 2, characterized in that the fog image processing step is performed by homomorphic filtering.

6. The method of claim 1, characterized in that the feature verification step further comprises:
(a) extracting a blackest image region, in which a gray scale histogram of the target region of a current frame of image is made, the maximum gray value and the minimum gray value are acquired in a gray level range of 1% to 99%, the darkest part of the image is extracted from the image by means of the maximum gray value, the minimum gray value and a preset threshold for judging a blackest part, to obtain a darkest region;
(b) circular-like detection, in which all outer boundaries of the blackest region are extracted, and for each boundary, a gravity center coordinate of the boundary is calculated with a moment of the boundary, a ji$^{th}$-order of the moment m$_{ji}$ of the boundary is defined as follows:

$$m_{ji} = \sum_{x,y} (f(x,y)x^j y^i)$$

the gravity center coordinate ($\bar{x}$, $\bar{y}$) is:

$$\bar{x} = \frac{m_{10}}{m_{00}}, \bar{y} = \frac{m_{01}}{m_{00}}$$

for all pixel points of the current boundary, a distance from each pixel to the gravity center is calculated, if a ratio of the maximum value of the calculated distances and the minimum value of the calculated distances exceeds a threshold for determining a circle, it is determined that the boundary does not correspond to a circular region and a next boundary is determined; otherwise, if the ratio of the maximum value of the calculated distances and the minimum value of the calculated distances does not exceed the preset value, it is determined that the boundary corresponds to a like-circular region and the gravity center coordinate and a radius of the like-circular region are recorded;
(c) determining whether there is an engine in the like-circular regions by calculating similarity; and
(d) detecting a front wheel of the aircraft.

7. The method of claim 6, characterized in that in the step (c), for M detected like-circular regions, a similarity degree Similarity$_{ij}$ between an i$^{th}$ like-circular region and a j$^{th}$ like-circular region is calculated as:

$$Similarity_{ij} = |Height_i - Height_j| * |Radius_i - Radius_j|$$

where Height is a height of the gravity center, and Radius is the radius, when the similarity degree Similarity$_{ij}$ is less than a preset similarity threshold, it is determined that the like-circular regions i and j are the aircraft engine.

8. The method of claim 7, characterized in that in step (c), if no aircraft engine is detected, the detection in the steps (a)-(c) are performed iteratively, with the threshold for judging a blackest part, the threshold for determining a circle and the similarity threshold being increased; if after that, still no aircraft engine is detected, an open operation is performed for all the blackest regions using a circular template of 7*7, and the steps (a)-(c) are performed for another time;
if still no aircraft engine is detected, the above detection steps are performed iteratively for another 2 times; and
if still not aircraft engine is detected, it is determined that there is no engine in the image.

9. The method of claim 8, characterized in that the threshold for judging a blackest part, the threshold for determining a circle and the similarity threshold are increased respectively by 0.05, 0.5 and 20.

10. The method of claim 6, characterized in that step (d) further comprises:
in the search region, 256 levels of grayscale are quantized to 64 levels, a first peak and a first valley are searched out in the histogram of the 64 levels of grayscale after the quantization, the optimal peak position BestPeak and the optimal valley position BestValley in the original histogram of the 256 levels of grayscale are defined as:

$$BestPeak = \underset{peak*4-4 \leq i \leq peak*4+3}{\arg\max} \{hist_{256}(i)\}$$

$$BestValley = \underset{BestPeak < i \leq valley*4+3}{\arg\min} \{hist_{256}(i)\}$$

where hist$_{256}$(i) represents a total number of pixels having a grayscale i in the histogram of the 256 levels of grayscale;
the grayscale is partitioned according to the optimal valley BestValley, for a part smaller than the optimal valley BestValle, trivial points with small areas are removed, and a closing operation is performed on the image with a flat elliptical structure element;
7$^{th}$-order Hu moment features of boundaries are calculated for all graphs after the closing operation and compared with Hu moments of a preset standard front wheel model, and if the similarity between them is less than a threshold, it is determined that the middle darkest region is the front wheel.

11. The method of claim 6, characterized in that the aircraft tracking step further comprises:
after a position of an engine in a previous frame of image is obtained, a region of an engine in a current frame of image is determined and tracked using a flood filling method;
if filling result is invalid, a dark environment detection and tracking step is performed to detect and track the engine region with parameters used in processing the previous frame of image;
after information about a region of an engine is acquired, the front wheel of the aircraft is detected in accordance with step (d); and
a front wheel tracking emergency processing step, in which when it is determined that the region of the front wheel has an incorrect shape, or the position of the front wheel deviates significantly from that in the previous frames of images, from information of the previous frame of image and the current frame of image, a shift of the front wheel in the frame is estimated using a shift of an engine in adjacent two frames, the estimated result is taken as a front wheel tracking result, and if no front wheel is detected in more than N frames of images, an error message is outputted.

12. The method of claim 11, characterized in that the aircraft positioning step comprises:
    a photographing device calibration and image correction step, configured to determine optical parameters of a photographing device and optical parameters of the photographing device with respect to the world coordinate system;
    en aircraft front wheel deviation degree calculating step; and
    an aircraft front wheel actual distance calculating step.

13. The method of claim 12, characterized in that the photographing device calibration and image correction step further comprises:
    retrieving N calibration pictures;
    a corner of a chessboard is found by using a function cvFindChessboardCorners ( ) of OpenCV, the retrieved N calibration pictures are respectively substituted to the function cvFindChessboardCorners ( ); if all the corners are successfully found, the function returns 1, and coordinates of the corners in the image coordinate system are acquired; and if it is not successful, the function returns 0; and
    coordinates of the corners which are successfully searched out in the calibration template are substituted into the function cvCalibrateCamera2( ), and the function returns a parameter matrix, a distortion coefficient, a rotation vector and a translation vector of the photographing device.

14. The method of claim 12, characterized in that the aircraft front wheel deviation degree calculating step further comprises:
    according to the coordinates $(x_0, y_0)$ of the obtained position of the front wheel, by utilizing a relationship between the coordinates of the position and the stop line, a linear equation of the guide line is calculated as $y_1=k_1x_1+b_1$, and a linear equation of the stop line is calculated as $y_2=k_2x_2+b_2$, and a distance from the coordinate point to the straight line is:

$$d = \frac{kx - y + b}{\sqrt{k^2 + 1}},$$

the coordinates $(x_0, y_0)$ are substituted into the two linear equations to obtain $d_1$ and $d_2$, $d_2 \geq 0$ means that the front wheel of the aircraft exceeds the stop line, $d_2<0$ means that the front wheel of the aircraft dose not reach the stop line; at this time, if $k_1>0$ $d_1>0$, it means that the aircraft is deviated to left, and $d_1<0$ means that the aircraft is deviated to right; and if $k_1>0$, $d_1<0$, it means that the aircraft is deviated to left, and $d_1>0$ means that the aircraft is deviated to right.

15. The method of claim 14, characterized in that the aircraft front wheel deviation degree calculating step further comprises:
    determining whether $|d_1|>$width/2 is satisfied, where width is a threshold equal to a width of a front wheel of an aircraft detected; if $|d_1|>$width/2 is satisfied, it means that the aircraft has deviated from the guide line.

16. The method of claim 12, characterized in that the aircraft front wheel actual distance calculating step further comprises:
    establishing a corresponding relationship between image coordinates and geodetic coordinates;
    obtaining image coordinates from the mark points in the configuration of the scene at the step for configuring an aircraft berthing scene, performing quadratic curve fitting on the image coordinates with a least squares method, to obtain a curve equation $y=ax^2+bx+c$, where x is a distance in the image, y is an actual distance;
    projecting the front wheel of the aircraft on the image on the guide line along a direction of the stop line, denoting an Euclidean distance from the projection point to the stop line by x, and obtaining the actual distance from the front wheel of the aircraft to the stop line from $y=ax^2+bx+c$.

17. The method of claim 1, characterized in that, an aircraft identification and identity verification step is performed after the aircraft capturing step and comprises:
    parameter verification, in which parameters of the aircraft in the image are extracted and compared with parameters of a corresponding model type preset in a database, to obtain a model similarity degree;
    template matching, in which the image is compared with a model template preset in the database, to obtain a template similarity degree;
    comprehensive judgment, in which when the model similarity degree and the template similarity degree are larger than or equal to a verification threshold, it is deemed that the identity verification is passed.

18. The method of claim 17, characterized in that the parameter verification step further comprises:
    (a) parameters of the aircraft engine in the image are extracted and compared with parameters of the aircraft engine of a corresponding model type preset in a database, to obtain a first ratio;
    (b) the aircraft wing parameters in the image are extracted and compared to aircraft wing parameters of the corresponding model preset in the database, to obtain a second ratio;
    (c) parameters of aircraft head in the image are extracted and compared with parameters of aircraft head corresponding to the model type preset in the database, to obtain a third ratio;
    (d) parameters of the aircraft tail in the image are extracted and compared with aircraft tail parameters preset to the corresponding model type in the database, to obtain a fourth ratio;
    (e) a minimum value and a maximum value among the first ratio, the second ratio, the third ratio, and the fourth ratio are taken, and the ratio of minimum/maximum is taken as the model similarity degree.

19. The method of claim 18, characterized in that the template matching step further comprises:
    global template matching, in which a global template similarity degree is calculated by taking the whole image as the image to be searched and the standard aircraft image as the template;
    local template matching, in which with the aircraft engine, the aircraft wings, the aircraft head, and the aircraft tail respectively extracted in the steps (a)-(d) as the images to be searched, and the engine, the wings, the head and the tail of the standard aircraft image as templates, 4 similarity degrees between the images to be searched and the templates are calculated, a minimum value of the 4 similarity degrees is removed, and an average of the remaining 3 similarity degrees of the 4 similarity degrees is taken as a local template similarity degree.

20. The method of claim 19, characterized in that the comprehensive judgment step further comprises: if at least two of the model similarity degree, the global template similarity degree and the local template similarity degree are larger than or equal to a first verification threshold, it is deemed that the identity verification is passed, or, if each of the model similarity degree, the global template similarity degree and the local template similarity degree is larger than a second verification threshold, it is deemed that the identity verification is passed.

21. A system for guiding an aircraft docking and recognizing an aircraft model based on machine vision, characterized in that the system comprises: a photographing device, a central processing device and a display device,
wherein the central processing device is configured to perform:
a step for configuring an aircraft berthing scene, in which a monitored scene is divided into regions for separate data processing;
an image pre-processing step, in which a captured image is pre-processed;
an aircraft capturing step, in which it is determined that an aircraft exists in the image by recognizing an engine and front wheels of the aircraft in the image;
an aircraft tracking step, in which the image of the engine and the front wheels of the aircraft recognized in the aircraft capturing step is continuously tracked and updated in real time;
an aircraft positioning step, in which the aircraft is positioned in real time, and a deviation degree of the aircraft from a guide line and a distance between the aircraft and a stop line are accurately determined; and
an information displaying step, in which the deviation degree of the aircraft from the guide line and the distance between the aircraft and the stop line determined in the aircraft positioning step are outputted and displayed, wherein the aircraft capturing step further comprises:
a background elimination step, in which a dynamic distribution of a background in the scene is simulated with a single Gaussian background model, a model of the background is established and the present image and the background model are differentiated to eliminate the background to obtain a foreground region;
a shade elimination step, gay values of respective pixels in the foreground region are computed to find the maximum gray value g max and the minimum gray value g min thereof, and shading elimination is performed on the regions with gray values lower than T=g min+(g max−g min)*0.5;
a region classification step, in which a template of a standard front view of an aircraft region is created, a target region is extracted through change detection, and a vertical projection curve of the target region is calculated, a correlation coefficient between the vertical projection curve of the target region and a vertical projection curve of the template of the standard front view of the aircraft region is calculated, if the correlation coefficient is larger than or equals to a classification threshold the target region is determined as an aircraft; and a feature verification step, in which it is further determined whether the target region is an aircraft by detecting the recognized engine and front wheel of the aircraft.

22. The system of claim 21, characterized in that after the aircraft capturing step, the central processing device is configured to perform:
an aircraft identification and identity verification step that comprises:
parameter verification, in which parameters of the aircraft in the image are extracted and compared with parameters of a corresponding model type preset in a database, to obtain a model similarity degree;
template matching, in which the image is compared with a model template preset in the database, to obtain a template similarity degree; and
comprehensive judgment, in which when the model similarity degree and the template similarity degree are larger than or equal to a verification threshold, it is deemed that the identity verification is passed,
wherein the parameter verification step further comprises:
(a) parameters of the aircraft engine in the image are extracted and compared with parameters of the aircraft engine of a corresponding model type preset in a database, to obtain a first ratio;
(b) the aircraft wing parameters in the image are extracted and compared to aircraft wing parameters of the corresponding model preset in the database, to obtain a second ratio;
(c) parameters of aircraft head in the image are extracted and compared with parameters of aircraft head corresponding to the model type preset in the database, to obtain a third ratio;
(d) parameters of the aircraft tail in the image are extracted and compared with aircraft tail parameters preset to the corresponding model type in the database, to obtain a fourth ratio; and
(e) a minimum value and a maximum value among the first ratio, the second ratio, the third ratio, and the fourth ratio are taken, and the ratio of minimum/maximum is taken as the model similarity degree;
the template matching step further comprises:
global template matching, in which a global template similarity degree is calculated by taking the whole image as the image to be searched and the standard aircraft image as the template;
local template matching, in which with the aircraft engine, the aircraft wings, the aircraft head, and the aircraft tail respectively extracted in the steps (a)-(d) as the images to be searched, and the engine, the wings, the head and the tail of the standard aircraft image as templates, 4 similarity degrees between the images to be searched and the templates are calculated, a minimum value of the 4 similarity degrees is removed, and an average of the remaining 3 similarity degrees of the 4 similarity degrees is taken as a local template similarity degree;
the comprehensive judgment step further comprises: if at least two of the model similarity degree, the global template similarity degree and the local template similarity degree are larger than or equal to a first verification threshold, it is deemed that the identity verification is passed, or, if each of the model similarity degree, the global template similarity degree and the local template similarity degree is larger than a second verification threshold, it is deemed that the identity verification is passed.

\* \* \* \* \*